United States Patent
Ishikawa et al.

(10) Patent No.: US 12,111,504 B2
(45) Date of Patent: Oct. 8, 2024

(54) ALIGNMENT METHOD FOR OPTICAL WAVEGUIDE ELEMENT

(71) Applicant: Nippon Telegraph and Telephone Corporation, Tokyo (JP)

(72) Inventors: Hiroshi Ishikawa, Tokyo (JP); Makoto Abe, Tokyo (JP); Norio Sato, Tokyo (JP); Atsushi Aratake, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 473 days.

(21) Appl. No.: 17/627,743

(22) PCT Filed: Jul. 18, 2019

(86) PCT No.: PCT/JP2019/028296
§ 371 (c)(1),
(2) Date: Jan. 17, 2022

(87) PCT Pub. No.: WO2021/009911
PCT Pub. Date: Jan. 21, 2021

(65) Prior Publication Data
US 2022/0317387 A1 Oct. 6, 2022

(51) Int. Cl.
*G02B 6/42* (2006.01)
*G02B 6/122* (2006.01)

(52) U.S. Cl.
CPC .......... *G02B 6/4204* (2013.01); *G02B 6/122* (2013.01); *G02B 6/422* (2013.01); *G02B 6/4239* (2013.01)

(58) Field of Classification Search
CPC ...... G02B 6/4204; G02B 6/122; G02B 6/422; G02B 6/4239; G02B 6/40; G02B 6/32
See application file for complete search history.

(56) References Cited

U.S. PATENT DOCUMENTS 5,317,452 A * 5/1994 Prentiss .................... G02B 6/32
65/387

FOREIGN PATENT DOCUMENTS

| JP | H0792349 A | 4/1995 |
| JP | H1020148 A | 1/1998 |

OTHER PUBLICATIONS

Hibino, Y. et al., "High reliability silica-based PLC 1×8 splitters on Si", Electronics Letters, IEEE, Apr. 14, 1994, vol. 30, No. 8, pp. 640-642.

(Continued)

*Primary Examiner* — Michael P Mooney
(74) *Attorney, Agent, or Firm* — Slater Matsil, LLP

(57) ABSTRACT

An optical waveguide alignment method includes a step of covering an end portion of an optical fiber, an end portion of a PLC, and a microlens with an adhesive before curing in a state in which at least one microlens is disposed between incidence and emission end faces of end portions of the optical fiber and the PLC, a step of causing light for alignment to be incident on at least one of the optical fiber or the PLC so that light enters a portion covered with the adhesive between the optical fiber and the PLC, and a step of curing the adhesive after the microlens moves onto an optical path between the optical fiber and the PLC due to radiation pressure of light. The optical fiber and the PLC are optically connected via the adhesive and the microlens, and the optical fiber, the PLC, and the microlens are mechanically connected by the adhesive.

20 Claims, 23 Drawing Sheets

(56) References Cited

OTHER PUBLICATIONS

Hibino, Y. et al., "High Reliability Optical Splitters Composed of Silica-Based Planar Lightwave Circuits", Journal of Lightwave Technology, IEEE, vol. 13, No. 8, Aug. 1995, pp. 1728-1735.

* cited by examiner

ALIGNMENT METHOD FOR OPTICAL WAVEGUIDE ELEMENT

CROSS-REFERENCE TO RELATED APPLICATION

This application is a national phase entry of PCT Application No. PCT/JP2019/028296, filed on Jul. 18, 2019, which application is hereby incorporated herein by reference.

TECHNICAL FIELD

The present disclosure relates to an alignment method for optical waveguide elements in a technical field that requires processing of an optical signal such as optical communication or optical sensing.

BACKGROUND

Industrial fields in which an optical signal processing technology such as optical communication or optical sensing is used continue to develop rapidly along with related fields. Similar to this optical signal processing technology, an electronic circuit technology continues to develop rapidly and is often used in combination with the optical signal processing technology. However, the optical signal processing technology has some drawbacks, unlike this electronic circuit technology. The drawbacks include miniaturization and a simple connection.

In an electronic circuit technology centered on silicon, because miniaturization directly leads to higher performance due to a scaling law, the miniaturization has been promoted very actively. However, in the optical signal processing technology, a spatial optical system becomes very large. Further, in a planar light wave circuit (PLC) by which a system smaller than the spatial optical system can be achieved, even a size of a waveguide, which is the most basic optical element, is on the order of several μm to hundreds of nm due to a cutoff condition, and a device size tends to be larger than that of the electronic circuit technology.

Next, in terms of simple connection, in the case of the electronic circuit technology, it is possible to very easily transmit signals simply by connecting a conductor such as metal in a low frequency region, and a pluggable connection technology such as an RF connector is mature in a high frequency region as well. However, in the case of the optical signal processing technology, it is not possible to achieve a good connection simply by connecting a medium that transmits an optical signal. Highly accurate alignment between devices is essential for good connectivity in the optical signal processing technology. For example, in the case of a device having a single-mode waveguide, alignment with an accuracy of a sub-μm order is required, although this depends on a material or design.

In the optical signal processing technology, it is common to use an optical fiber that is a single-mode optical waveguide for transmission of optical signals. In a system that implements an optical signal processing technology, while using the optical fiber for transmission of an optical signal as described above, an optical element that processes the transmitted optical signal is required. Examples of the optical element that processes an optical signal include a PLC, a fiber Bragg grating (FBG), and a laser diode (LD). These optical elements also use a single-mode optical waveguide in many cases. Thus, it is common for the optical fiber and the optical element described above to be classified as a single-mode optical waveguide element. Therefore, alignment with an accuracy of a sub-μm order is required for construction of a system or module that implements the optical signal processing technology.

Among connections between single-mode optical waveguide elements such as optical fibers, PLCs, and LDs, one representative connection is a direct optical connection between a PLC and an optical fiber (see Non Patent Literatures 1 and 2).

In an example of bonding a PLC and an optical fiber illustrated in FIG. 17, a quartz-based PLC 701 and an optical fiber 702 form an optical connection. A waveguide 703 is formed in the quartz-based PLC 701. In the waveguide 703, Ge-doped $SiO_2$ is used as a core, and non-doped $SiO_2$ is used as a clad. In FIG. 17, the waveguide 703 constitutes a Mach-Zehnder interferometer, but this is merely an example and any circuit may be included.

A glass block 706 and the quartz-based PLC 701 are bonded in advance, and the optical fiber 702 and the fiber block 705 are also bonded in advance. The bonding between the glass block 706 and the quartz-based PLC 701 and the bonding between the optical fiber 702 and the fiber block 705 are physical bonding and are formed prior to optical connection. In order to perform optical bonding, typically, a core cross section of the optical fiber 702 bonded to the fiber block 705 is brought close to a core cross section of the optical waveguide 703 at an end face of the quartz-based PLC 704 and an optimal position of the optical fiber 702 is determined by active alignment. After the optimum position is determined, the fiber block 705 is fixed to the glass block 706 and the quartz-based PLC 701 using an adhesive 704. A configuration illustrated in FIG. 17 is a form often found in quartz-based PLCs.

In a structure illustrated in FIG. 17, alignment of optical connection between the PLC and the optical fiber is performed by active alignment as described above. The active alignment is an alignment scheme in which a dedicated device is typically used, and is a scheme of passing light through a PLC and an optical fiber and adjusting a position while observing propagating light. In the active alignment, it is common to observe intensity of the propagating light, determine that the position is most appropriate when the intensity of the propagating light is maximized, and bond the PLC with the optical fiber.

On the other hand, there is also a concept of passive alignment. In the passive alignment, it is proposed that alignment is performed by fitting or butting using a physical structure of elements to be aligned without requiring a dedicated device or requiring observation of propagating light. However, in general, a scheme of passive alignment between single-mode optical waveguide elements is not mature.

Single-mode optical waveguide elements can be broadly classified into two types: optical fibers and optical elements other than optical fibers, such as a PLC. There is no mature passive alignment technology in the optical connection between optical elements such as a PLC and an optical fiber. Further, similarly, there is no mature passive alignment technology in optical connection between optical elements such as PLCs. Only for passive alignment between optical fibers, there is a mature technology such as an optical connector or mechanical splicing. However, a technology of passive alignment between optical fibers is applicable only to a classical single-mode fiber (SMF) and a polarizationmaintaining fiber (PMF). For a multi-core optical fiber (MCF), there is no passive alignment scheme as mature as the SMF or the PMF.

As described above, most of the optical connection between the optical element such as a PLC and the optical fiber achieved in the example illustrated in FIG. 17 and a more typical optical connections between single-mode optical waveguide elements require active alignment. However, the active alignment has a problem that a complicated mounting device is required, a mounting time is long, and a mounting cost is high. Although such a problem is solved by the passive alignment, a scheme of appropriate passive alignment between single-mode optical waveguide elements has not been established.

CITATION LIST

Non Patent Literature

Non Patent Literature 1: Yoshinori Hibino, 5 others, "High reliability silica-based PLC 1×8 splitters on Si", Electronics Letters, IEEE, April 1994, Vol. 30, No. 8, pp. 640-642

Non Patent Literature 2: Yoshinori Hibino, 4 others, "High Reliability Optical Splitters Composed of Silica-Based Planar Lightwave Circuits", JOURNAL OF LIGHTWAVE TECHNOLOGY, IEEE, August 1995, Vol. 13, No. 8, pp. 1728-1735

SUMMARY

Technical Problem

The present disclosure has been made in view of the above problems, and an object of the present disclosure is to provide an alignment method capable of achieving a connection between optical waveguide elements through passive alignment and reducing a mounting time and a mounting cost in the connection between the optical waveguide elements.

Means for Solving the Problem

An alignment method for optical waveguide elements according to an embodiment includes covering, in a state in which at least one spatial optical element is disposed between incidence and emission end faces of end portions of at least two optical waveguide elements, each of the end portions of the at least two optical waveguide elements and the at least one spatial optical element with a bonding material in a semi-solid state, causing light for alignment to be incident on at least one of the at least two optical waveguide elements so that light enters a portion covered with the bonding material between the at least two optical waveguide elements, and changing the bonding material into a solid state after the at least one spatial optical element moves onto an optical path between the incidence and emission end faces of the at least two optical waveguide elements due to radiation pressure of light acting on the at least one spatial optical element, in which the at least two optical waveguide elements are optically connected via the bonding material and the at least one spatial optical element, and each of the at least two optical waveguide elements and the at least one spatial optical element are mechanically connected by the bonding material.

Effects of Embodiments of the Invention

According to the present disclosure, it is possible to achieve the connection between the optical waveguide elements through passive alignment and reduce a mounting time and a mounting cost in the connection between the optical waveguide elements by covering the end portion of the optical waveguide element and the spatial optical element with the bonding material in a semi-solid state in a state in which the at least one spatial optical element is disposed between the incidence and emission end faces of the end portions of the at least two optical waveguide elements, causing the light for alignment to be incident on the at least one of the optical waveguide elements so that the light enters the portion covered with the bonding material between the at least two optical waveguide elements, and changing the bonding material into the solid state after the spatial optical element moves onto the optical path between the incidence and emission end faces of the at least two optical waveguide elements due to the radiation pressure of light acting on the spatial optical element.

DETAILED DESCRIPTION OF ILLUSTRATIVE EMBODIMENTS

First Embodiment

Figure 1A:
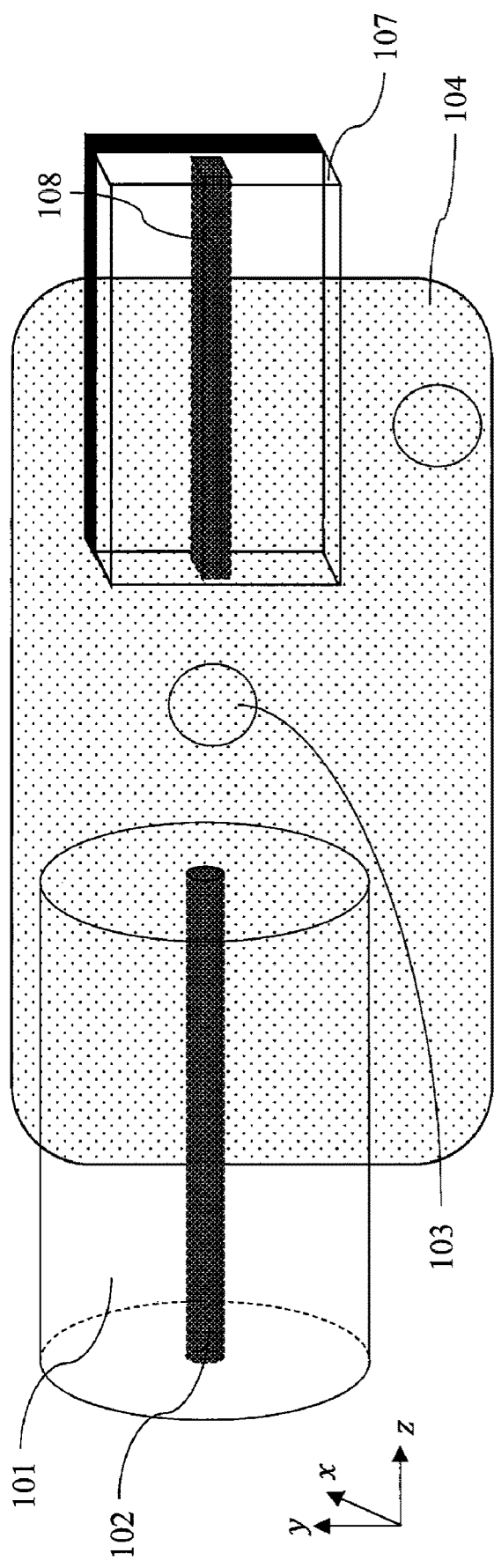
FIGS. 1A and 1B are a perspective view of a connection structure of optical waveguide elements according to a first embodiment, and a cross-sectional view of a connection structure of the optical waveguide elements before optical connection.
Figure 1B:
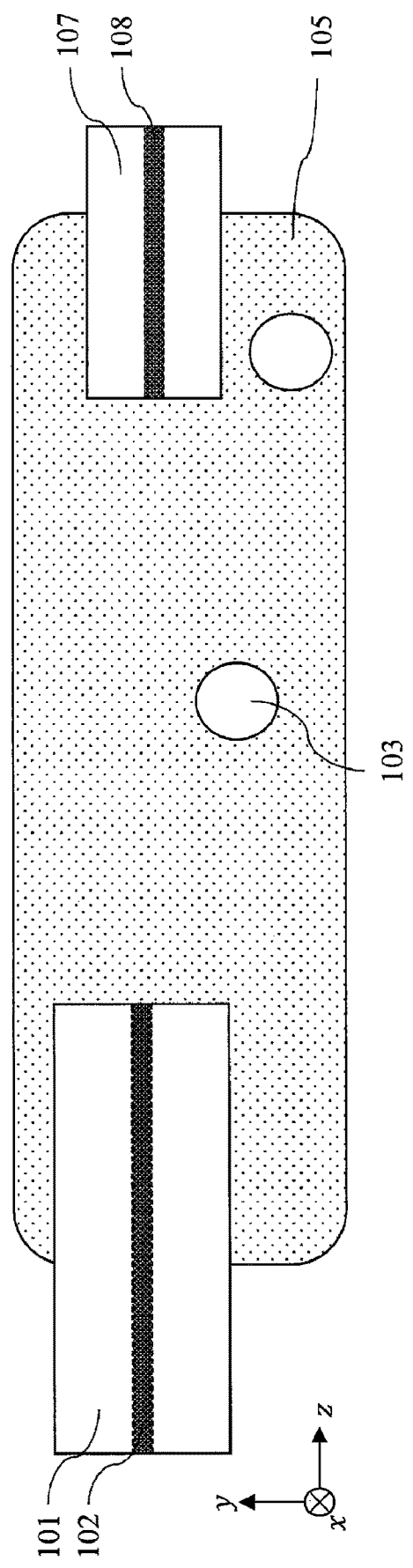
Figure 2:
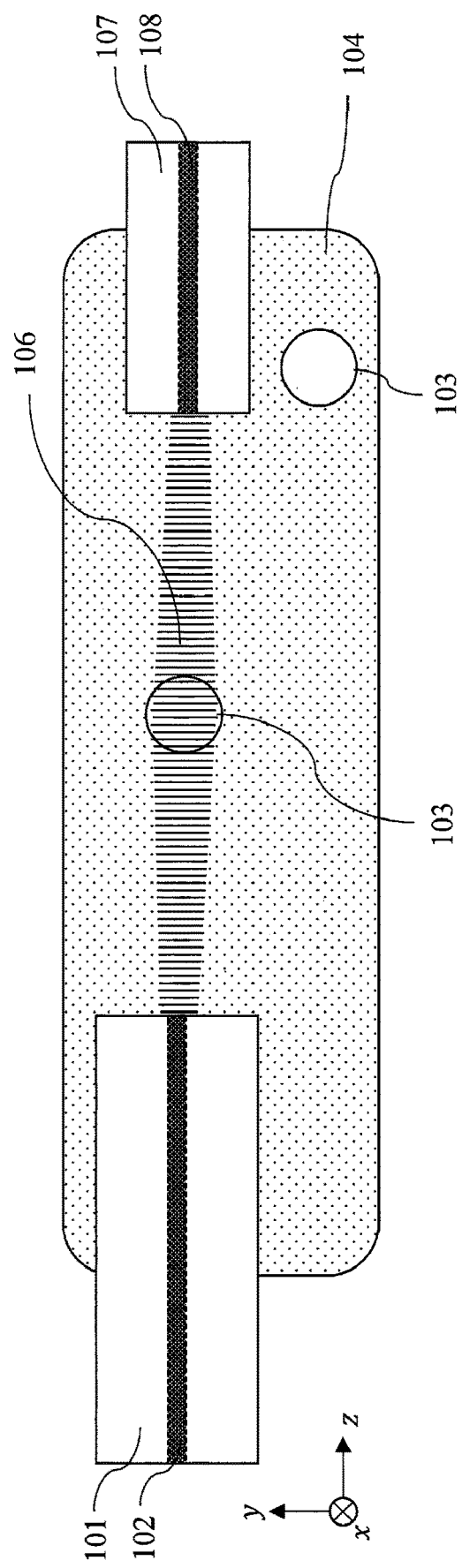
FIG. 2 is a cross-sectional view of the connection structure of the optical waveguide elements after optical connection according to the first embodiment.

Hereinafter, a first embodiment will be described with reference to the drawings. An example in which an optical fiber which is an optical waveguide element and a PLC which is another optical waveguide element are connected via one microlens will be described in the present example. FIGS. 1A, 1B, and 2 are schematic views illustrating a connection structure of optical waveguide elements according to the present example. FIG. 1A is a perspective view of a connection structure of the optical waveguide elements, FIG. 1B is a cross-sectional view of a connection structure before optical connection cut along a yz plane, and FIG. 2 is a cross-sectional view of a connection structure after optical connection cut along the yz plane.

As illustrated in FIG. 1A, an optical fiber core 102 is formed inside an optical fiber tot A PLC core 108 is formed inside a PLC 107. The optical fiber 101 and the PLC 107 are optically connected by a cured adhesive 104 and a microlens 103. Further, the cured adhesive 104 mechanically connects the optical fiber 101, the PLC 107, and the microlens 103.

As is clear from the cross-sectional view before optical connection illustrated in FIG. 1B, an end portion of the optical fiber 101, an end portion of the PLC 107, and the microlens 103 are all covered with the adhesive 105 before curing. In the state of FIG. 1B, light waves for alignment for operating optical tweezers are passed through at least one of the optical fiber 101 or the PLC 107, so that a position of the microlens 103 can be changed in the adhesive 105 before curing.

Figure 3:
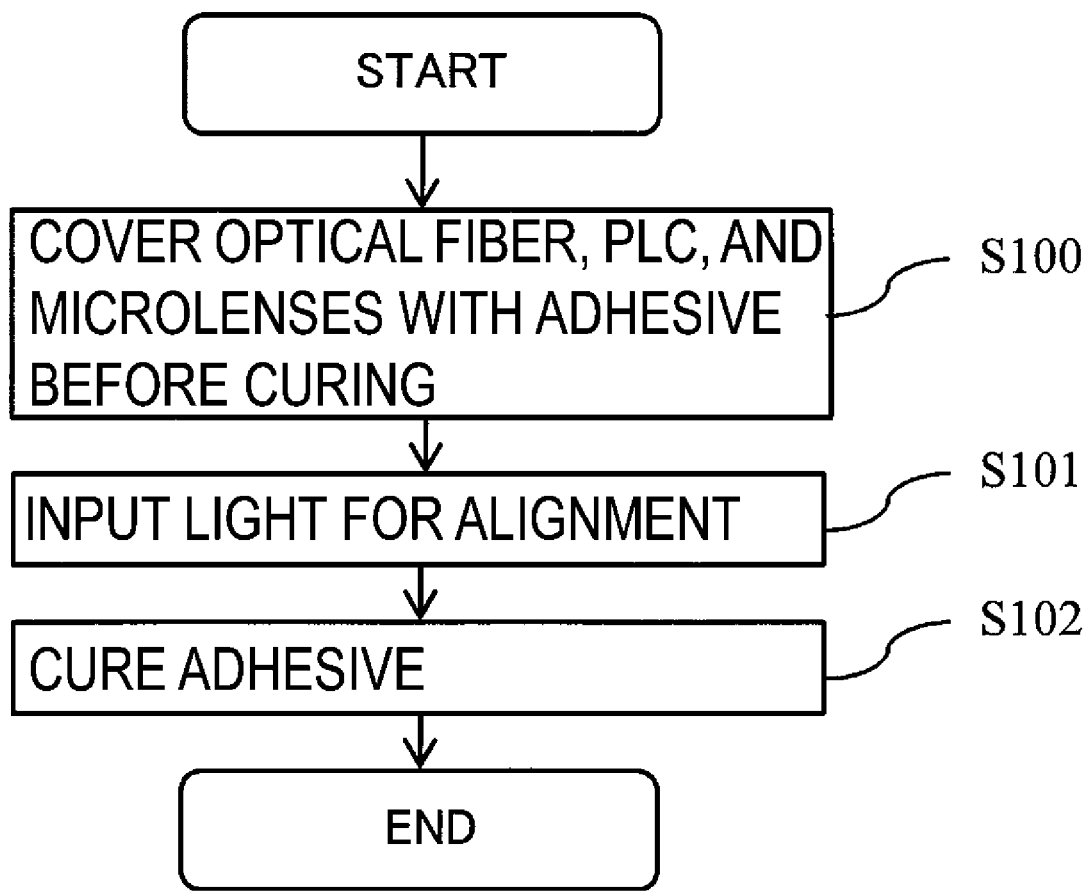
FIG. 3 is a flowchart illustrating an alignment method according to the first embodiment.

FIG. 3 is a flowchart illustrating an alignment method of the present example. First, the end portion of the optical fiber 101, the end portion of the PLC 107, and the microlens 103 are covered with the adhesive 105 (bonding material) that is in a semi-solid state before curing in a state in which an incidence and emission end face at the end portion of the optical fiber 101 and an incidence and emission end face at the end portion of the PLC 107 face each other, and at least one microlens 103 is disposed between the end portion of the optical fiber 101 and the end portion of the PLC 107, as illustrated in FIG. 1B (step S100 in FIG. 3). In this case, a pedestal, a jig, or the like may be used to dispose the optical fiber 101, the PLC 107, and the microlens 103.

A spatial optical element (the microlens 103 in the present example) is completely covered with the adhesive 105, so that a stable operation can be enabled in a step of passive alignment between the optical waveguide elements and reliability can be improved.

Subsequently, light for alignment is caused to be incident on at least one of the optical fiber 101 or the PLC 107 from a light source for alignment (not illustrated) so that the light enters a portion covered with the adhesive 105 between the end portion of the optical fiber 101 and the end portion of the PLC 107 (step S101 in FIG. 3). When the light for alignment is caused to be incident on the portion covered with the adhesive 105 between the end portion of the optical fiber 101 and the end portion of the PLC 107, the microlens 103 is moved to a position where light intensity becomes high due to radiation pressure of the light acting on the microlens 103.

After the microlens 103 is moved, the incidence of the light for alignment is stopped and the adhesive 105 is cured (step S102 in FIG. 3). When the adhesive 105 is of a UV curable type, the adhesive 105 may be irradiated with ultraviolet rays, and when the adhesive 105 is of a thermosetting type, the adhesive 105 may be heated.

Thus, the adhesive 105 changes state to a cured solid adhesive 104, and the optical fiber 101, the PLC 107, and the microlens 103 are mechanically connected. Further, it is possible to obtain a stable optical connection between the optical fiber 101 and the PLC 107 via the cured adhesive 104 and the microlens 103, and to achieve the alignment between the optical fiber 101 and the PLC 107. Therefore, in the present example, it is possible to achieve the optical connection between the optical fiber 101 and the PLC 107 using only passive alignment without active alignment, and to reduce a mounting time and a mounting cost in the connection between the optical fiber 101 and the PLC 107 in comparison with a case in which the active alignment is used.

In the state of FIG. 1B, even when there is a deviation between xy coordinates of an optical axis of the optical fiber 101 and xy coordinates of an optical axis of the PLC 107, it is possible to move the microlens 103 to an appropriate position on an optical path in which intensity of the light incident on the adhesive 105 from the optical fiber 101 and intensity of the light incident on the adhesive 105 from the PLC 107 are balanced, by causing the light for alignment to be simultaneously incident on both the optical fiber 101 and the PLC 107.

It is possible to change a mode of propagation of light 106 in the communication wavelength band using the microlens 103 in a state in which the alignment is completed as illustrated in FIG. 2, by performing a design so that an optical length of a longest portion of an outer shape of the microlens 103 exceeds a wavelength of light in a desired communication wavelength band. Specifically, it is possible to cause the light 106 emitted from the optical fiber 101 to be incident on the PLC core 108 of the PLC 107 via the microlens 103. On the other hand, the light 106 emitted from the PLC 107 can be incident on the optical fiber core 102 of the optical fiber 101 via the microlens 103.

The adhesive 105 before curing and the microlens 103 are required to have different refractive indexes at a wavelength of the light for alignment. For the achievement of the alignment of the present example, it is necessary for a proportion of a volume of the microlens 103 not to exceed 74% of a total volume of the adhesive 105 before curing and the microlens 103.

The wavelength of the light 106 in a communication wavelength band used in a practical use stage of optical signal processing may be the same as or different from the wavelength of the light for alignment. Similarly, intensity of the light 106 in the communication wavelength band may be the same as or different from the intensity of the light for alignment. In the present disclosure, it is possible to improve a flexibility in design through separation into the wavelength of the light for alignment and the wavelength of the light 106 in the communication wavelength band at the time of use after the mounting is completed.

A UV curable adhesive or a thermosetting adhesive is optimal as the bonding material, but a material or a curing method is not limited to the present example as long as the material is transparent to the light in the communication wavelength band and the light for alignment.

In the present disclosure, the number of spatial optical elements (microlenses 103 in the present example) exceeding the number required for optical connection between optical waveguide elements may be contained in the adhesive. That is, when there is no problem in the optical connection, there may be a microlens 103 through which the light 106 in the communication wavelength band does not pass and that does not contribute to the optical connection. In the example of FIG. 2, one of the two microlenses 103, which deviates from a position between the optical fiber 101 and the PLC 107, does not contribute to the optical connection between the optical fiber 101 and the PLC 107. In the present disclosure, it is possible to provide a margin in work of a mounting step, and to reduce a mounting time and a mounting cost by using the number of spatial optical elements exceeding the number required for optical connection between the optical waveguide elements.

Second Embodiment

Figure 4A:
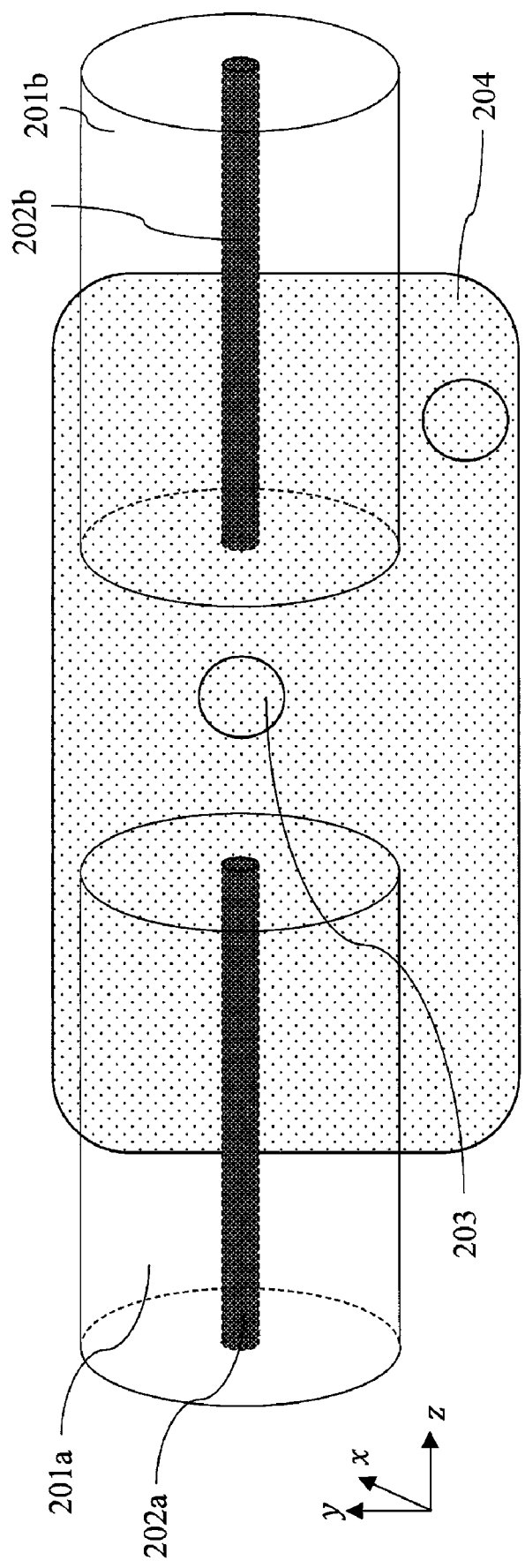
FIGS. 4A and 4B are a perspective view of a connection structure of optical waveguide elements according to a second embodiment, and a cross-sectional view of the connection structure of the optical waveguide elements before optical connection.
Figure 4B:
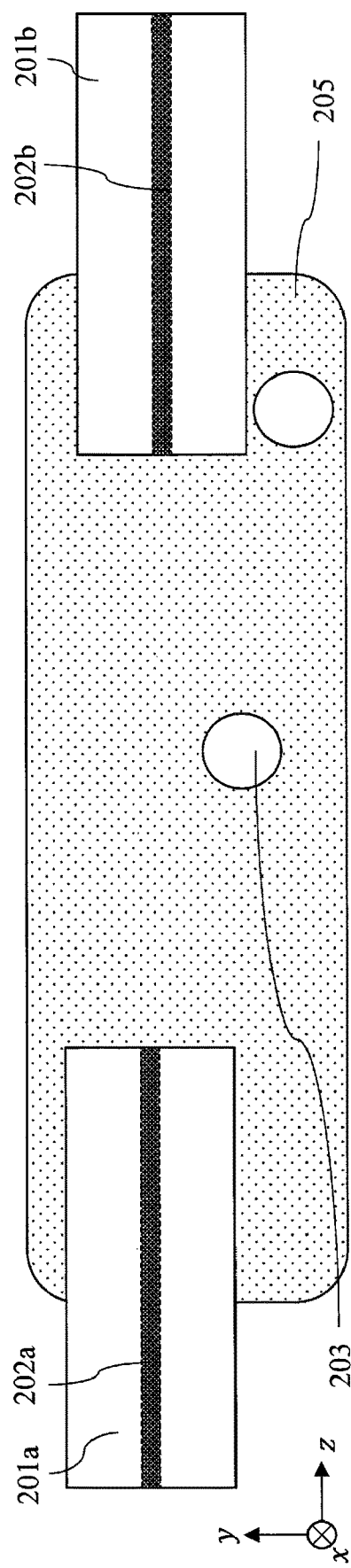
Figure 5:
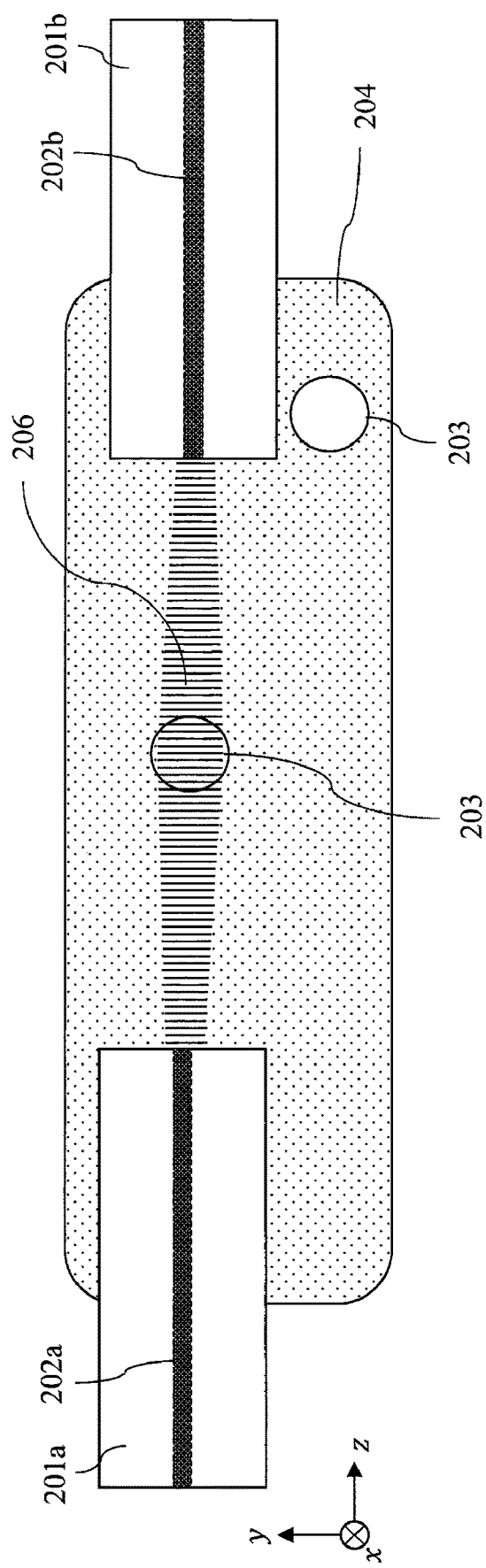
FIG. 5 is a cross-sectional view of the connection structure of the optical waveguide elements after optical connection according to the second embodiment.

Next, a second embodiment will be described. An example in which optical fibers are connected to each other via one microlens will be described in the present example. FIGS. 4A, 4B, and 5 are schematic views illustrating a connection structure of the optical waveguide elements according to the present example. FIG. 4A is a perspective view of a connection structure of the optical waveguide elements, FIG. 4B is a cross-sectional view of a connection structure before optical connection cut along a yz plane, and FIG. 5 is a cross-sectional view of a connection structure after optical connection cut along the yz plane.

As illustrated in FIG. 4A, an optical fiber core 202a is formed inside an optical fiber 201a, and an optical fiber core 202b is formed inside an optical fiber 201b. The two optical fibers 201a and 201b, are optically connected by a cured adhesive 204 and a microlens 203. Further, the cured adhesive 204 mechanically connects the two optical fibers 201a and 201b and the microlens 203.

As is clear from the cross-sectional view before optical connection illustrated in FIG. 4B, both end portions of the optical fibers 201a and 201b and the microlens 203 are covered with an adhesive 205 before curing. In the state of FIG. 4B, light waves for alignment for operating optical tweezers are passed through at least one of the two optical fibers 201a or 201b, so that a position of the microlens 203 can be changed in the adhesive 205 before curing.

Figure 6:
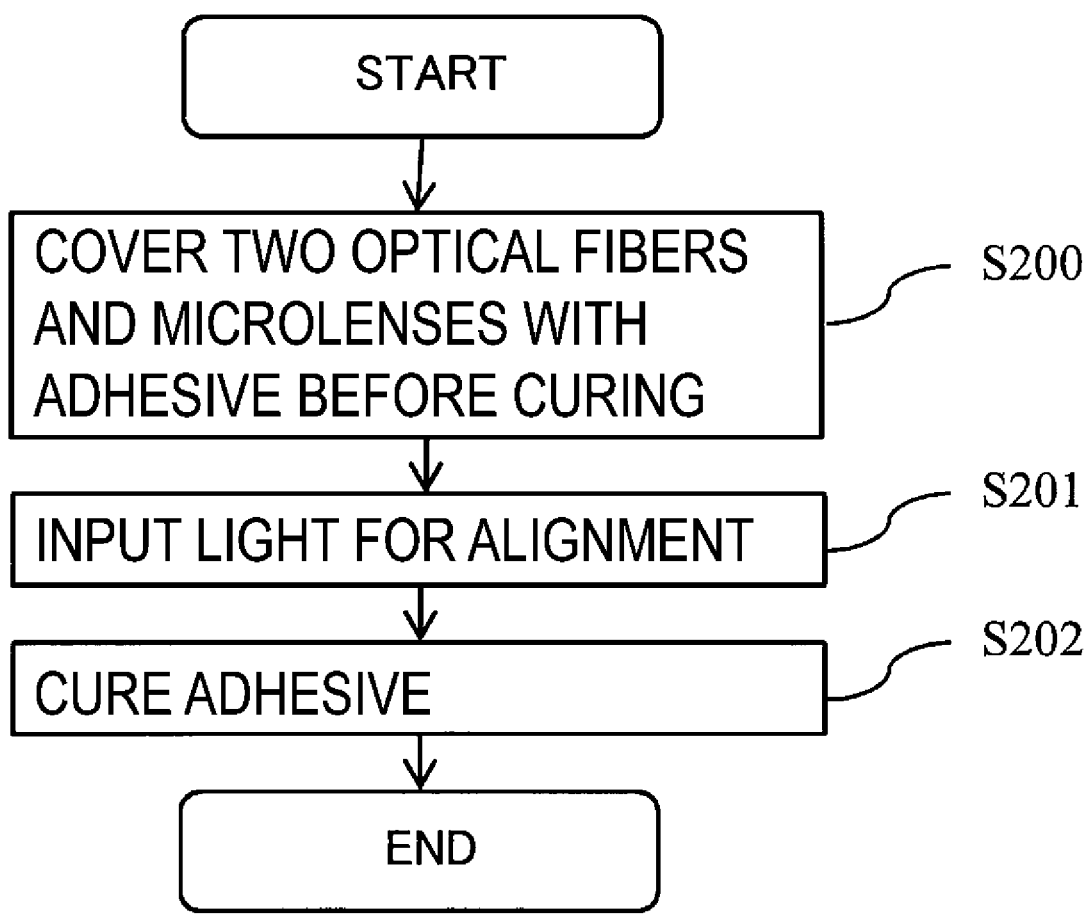
FIG. 6 is a flowchart illustrating an alignment method according to the second embodiment.

FIG. 6 is a flowchart illustrating an alignment method of the present example. First, end portions of the optical fibers 201a and 201b and the microlens 203 are covered with the adhesive 205 (bonding material) that is in a semi-solid state before curing in a state in which incidence and emission end faces of the end portions of the two optical fibers 201a and 201b face each other, and at least one microlens 203 is disposed between the end portion of the optical fiber 201a and the end portion of the optical fiber 201b, as illustrated in FIG. 4B (step S200 in FIG. 6). In this case, a pedestal, a jig, or the like may be used to dispose the optical fibers 201a and 201b and the microlens 203.

Subsequently, light for alignment is caused to be incident on at least one of the optical fibers 201a or 201b from a light source for alignment (not illustrated) so that the light enters a portion covered with the adhesive 205 between the end portion of the optical fiber 201a and the end portion of the optical fiber 201b (step S201 in FIG. 6). When the light for alignment is caused to be incident on the portion covered with the adhesive 205 between the end portion of the optical fiber 201a and the end portion of the optical fiber 201b, the microlens 203 is moved to a position where light intensity becomes high due to radiation pressure of the light acting on the microlens 203.

After the microlens 203 is moved, the incidence of the light for alignment is stopped and the adhesive 205 is cured (step S202 in FIG. 6). Thus, the adhesive 205 changes state to a cured solid adhesive 204, and the optical fibers 201a and 201b and the microlens 203 are mechanically connected. Further, it is possible to obtain a stable optical connection between the optical fibers 201a and 201b via the cured adhesive 204 and the microlens 203, and to achieve the alignment between the optical fibers 201a and 201b. Therefore, in the present example, it is possible to achieve the optical connection between the optical fibers 201a and 201b using only passive alignment without active alignment, and to reduce a mounting time and a mounting cost in the connection between the optical fibers 201a and 201b in comparison with a case in which the active alignment is used.

Similar to the first embodiment, even when there is a deviation between xy coordinates of an optical axis of the optical fiber 201a and xy coordinates of an optical axis of the optical fiber 201b in the state of FIG. 4B, it is possible to move the microlens 203 to an appropriate position on an optical path in which intensity of the light incident on the adhesive 205 from the optical fiber 201a and intensity of the light incident on the adhesive 205 from the optical fiber 201b are balanced, by causing the light for alignment to be simultaneously incident on both of the optical fibers 201a and 201b.

It is possible to change a mode of propagation of light 206 in the communication wavelength band using the microlens 203 in a state in which the alignment is completed as illustrated in FIG. 5, by performing a design so that an optical length of a longest portion of an outer shape of the microlens 203 exceeds a wavelength of light in a desired communication wavelength band. Specifically, it is possible to cause the light 206 emitted from the optical fiber 201a to be incident on the optical fiber core 202b of the optical fiber 201b via the microlens 203. On the other hand, it is possible to cause the light 206 emitted from the optical fiber 201b to be incident on the optical fiber core 202a of the optical fiber 201a via the microlens 203.

The adhesive 205 before curing and the microlens 203 are required to have different refractive indexes at a wavelength of the light for alignment. For the achievement of the alignment of the present example, it is necessary for a proportion of a volume of the microlens 203 not to exceed 74% of a total volume of the adhesive 205 before curing and the microlens 203. The wavelength of the light 206 in a communication wavelength band used in a practical use stage of optical signal processing may be the same as or different from the wavelength of the light for alignment. Similarly, intensity of the light 206 in the communication wavelength band may be the same as or different from the intensity of the light for alignment.

A UV curable adhesive or a thermosetting adhesive is optimal as the bonding material, but a material or a curing method is not limited to the present example as long as the material is transparent to the light in the communication wavelength band and the light for alignment. Further, when there is no problem in the optical connection, there may be a microlens 203 through which the light 206 in the communication wavelength band does not pass and that does not contribute to the optical connection. In the example of FIG. 5, one of the two microlenses 203, which deviates from a position between the optical fibers 201*a* and 201*b*, does not contribute to the optical connection between the optical fibers 201*a* and 201*b*.

Third Embodiment

Figure 7A:
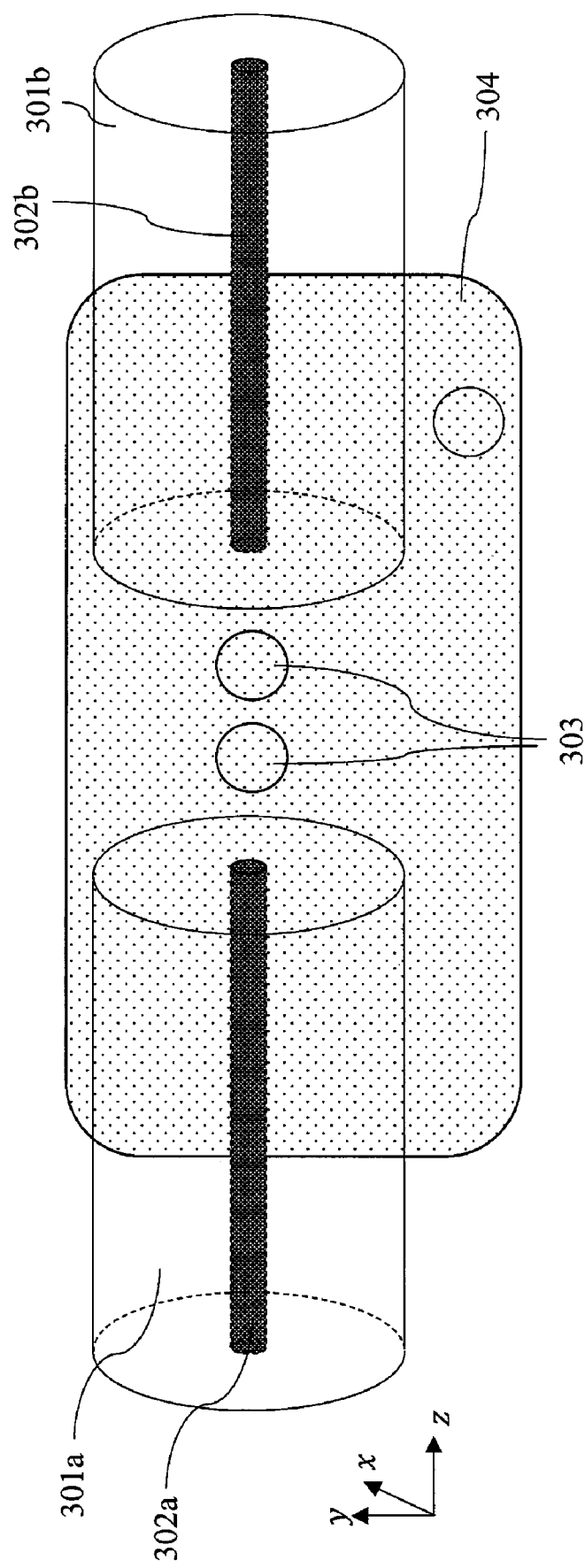
FIGS. 7A and 7B are a perspective view of a connection structure of optical waveguide elements according to a third embodiment, and a cross-sectional view of the connection structure of the optical waveguide elements before optical connection.
Figure 7B:
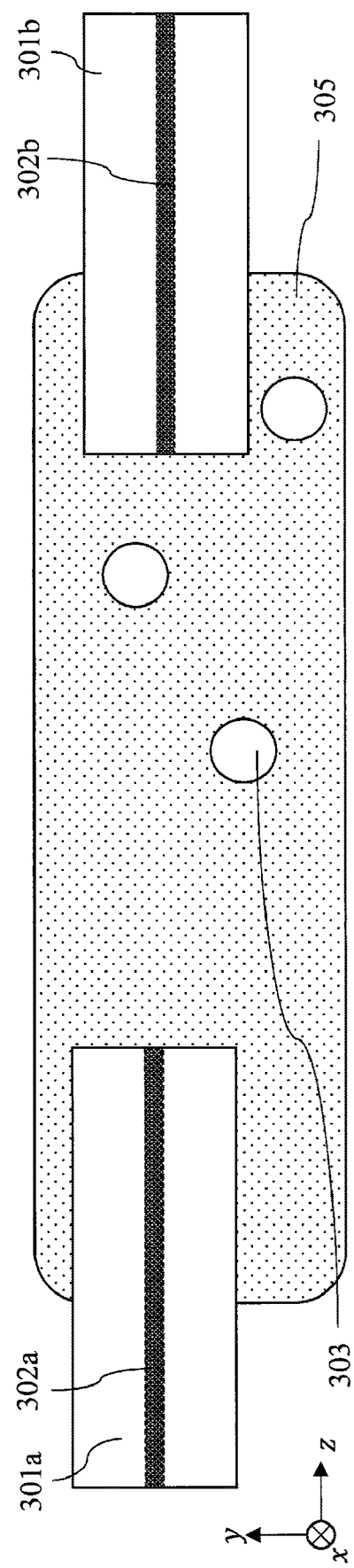
Figure 8:
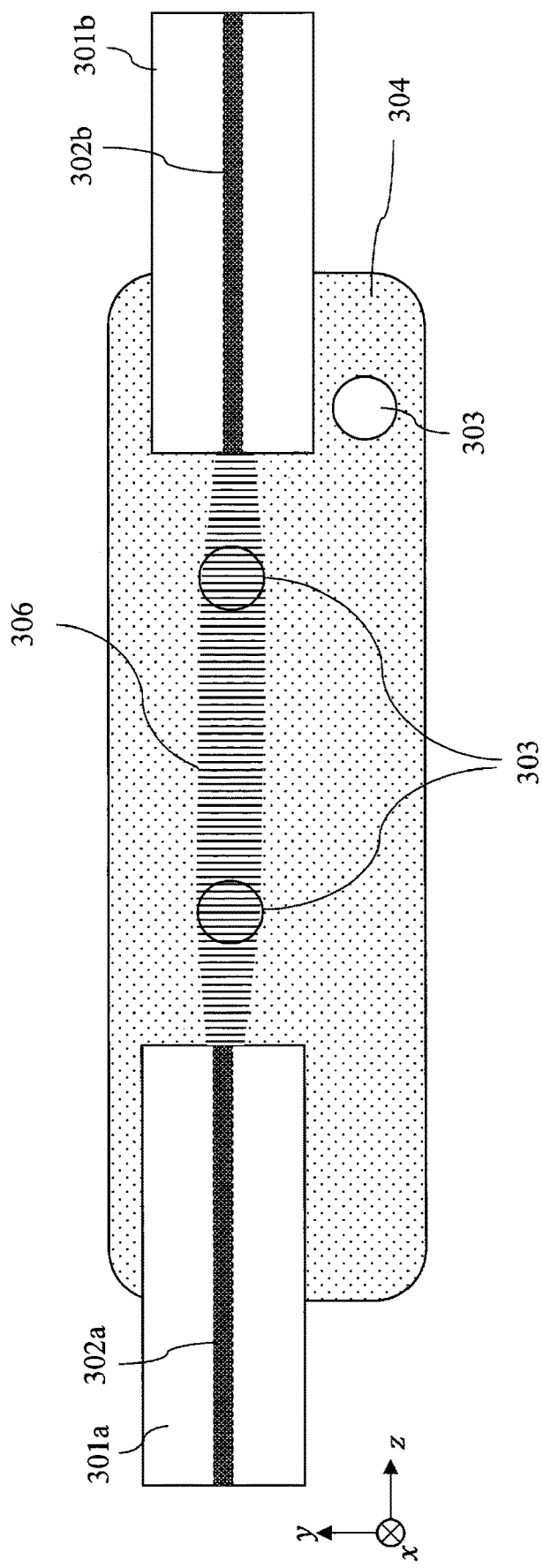
FIG. 8 is a cross-sectional view of the connection structure of the optical waveguide elements after optical connection according to the third embodiment.

Next, a third embodiment will be described. An example in which optical fibers are connected to each other via two microlenses will be described in the present example. FIGS. 7A, 7B, and 8 are schematic views illustrating a connection structure of the optical waveguide elements according to the present example. FIG. 7A is a perspective view of a connection structure of the optical waveguide elements, FIG. 7B is a cross-sectional view of a connection structure before optical connection cut along a yz plane, and FIG. 8 is a cross-sectional view of a connection structure after optical connection cut along the yz plane.

As illustrated in FIG. 7A, an optical fiber core 302*a* is formed inside an optical fiber 301*a*, and an optical fiber core 302*b* is formed inside an optical fiber 301*b*. The two optical fibers 301*a* and 301*b* are optically connected by a cured adhesive 304 and two microlenses 303. Further, the cured adhesive 304 mechanically connects the two optical fibers 301*a* and 301*b* and the microlens 303.

As is clear from the cross-sectional view before optical connection illustrated in FIG. 7B, both end portions of the optical fibers 301*a* and 301*b*, and the microlens 303 are covered with an adhesive 305 before curing. In a state of FIG. 7B, light waves for alignment for operating optical tweezers are passed through at least one of the two optical fibers 301*a* or 301*b*, so that a position of the microlens 303 can be changed in the adhesive 305 before curing.

Because a flow of alignment processing in the present example is the same as that of the second embodiment, an alignment method of the present example will be described with reference to FIG. 6. First, end portions of the optical fibers 301*a* and 301*b* and the microlens 303 are covered with the adhesive 305 (bonding material) that is in a semi-solid state before curing in a state in which incidence and emission end faces of the end portions of the two optical fibers 301*a* and 301*b*, face each other, and a plurality of microlenses 303 are disposed between the end portion of the optical fiber 301*a* and the end portion of the optical fiber 301*b*, as illustrated in FIG. 7B (step S200 in FIG. 6). In this case, a pedestal, a jig, or the like may be used to dispose the optical fibers 301*a* and 301*b* and the microlens 303.

Subsequently, light for alignment is caused to be incident on at least one of the optical fibers 301*a* or 301*b* from a light source for alignment (not illustrated) so that the light enters a portion covered with the adhesive 305 between the end portion of the optical fiber 301*a* and the end portion of the optical fiber 301*b* (step S201 in FIG. 6). When the light for alignment is caused to be incident on the portion covered with the adhesive 305 between the end portion of the optical fiber 301*a* and the end portion of the optical fiber 301*b*, the plurality of microlenses 303 (two microlenses 303 in the present example) are moved to a position where light intensity becomes high due to radiation pressure of the light.

After the microlens 303 is moved, the incidence of the light for alignment is stopped and the adhesive 305 is cured (step S202 in FIG. 6). Thus, the adhesive 305 changes state to a cured solid adhesive 304, and the optical fibers 301*a* and 301*b* and the microlens 303 are mechanically connected. Further, it is possible to obtain a stable optical connection between the optical fibers 301*a* and 301*b* via the cured adhesive 304 and the two microlenses 303, and to achieve the alignment of the optical fibers 301*a* and 301*b*. Therefore, in the present example, it is possible to achieve the optical connection between the optical fibers 301*a* and 301*b* using only passive alignment without active alignment, and to reduce a mounting time and a mounting cost in the connection between the optical fibers 301*a* and 301*b* in comparison with a case in which the active alignment is used.

Similar to the second embodiment, even when there is a deviation between xy coordinates of an optical axis of the optical fiber 301*a* and xy coordinates of an optical axis of the optical fiber 301*b* in the state of FIG. 7B, it is possible to move the microlens 303 to an appropriate position on an optical path in which intensity of the light incident on the adhesive 305 from the optical fiber 301*a* and intensity of the light incident on the adhesive 305 from the optical fiber 301*b* are balanced, by causing the light for alignment to be simultaneously incident on both the optical fibers 301*a* and 301*b*. In the present example, two microlenses 303 are disposed between the end portion of the optical fiber 301*a* and the end portion of the optical fiber 301*b* before the optical connection. The two microlenses 303 are moved to be aligned with a position on the optical path in which the intensity of the light incident on the adhesive 305 from the optical fiber 301*a* and the intensity of the light incident on the adhesive 305 from the optical fiber 301*b* are balanced.

It is possible to change a mode of propagation of light 306 in the communication wavelength band using the microlens 303 in a state in which the alignment is completed as illustrated in FIG. 8, by performing a design so that an optical length of a longest portion of an outer shape of the microlens 303 exceeds a wavelength of light in a desired communication wavelength band. Specifically, it is possible to cause the light 306 emitted from the optical fiber 301*a* to be incident on the optical fiber core 302*b* of the optical fiber 301*b* via the two microlenses 303. On the other hand, it is possible to cause the light 306 emitted from the optical fiber 301*b* to be incident on the optical fiber core 302*a* of the optical fiber 301*a* via the two microlenses 303.

The adhesive 305 before curing and the microlens 303 are required to have different refractive indexes at a wavelength of the light for alignment. For the achievement of the alignment of the present example, it is necessary for a proportion of a volume of the microlens 303 not to exceed 74% of a total volume of the adhesive 305 before curing and the microlens 303. The wavelength of the light 306 in a communication wavelength band used in a practical use stage of optical signal processing may be the same as or different from the wavelength of the light for alignment. Similarly, intensity of the light 306 in the communication wavelength band may be the same as or different from the intensity of the light for alignment.

A UV curable adhesive or a thermosetting adhesive is optimal as the bonding material, but a material or a curing method is not limited to the present example as long as the material is transparent to the light in the communication wavelength band and the light for alignment.

In the present example, because the number of microlenses 303 contributing to the optical connection between the optical fibers 301*a* and 301*b* is 2, it is possible to increase a flexibility in design in comparison with a case in which the number of microlenses contributing to the optical connection is smaller than 2.

Further, when there is no problem in the optical connection, there may be a microlens 303 through which the light 306 in the communication wavelength band does not pass and that does not contribute to the optical connection. In the example of FIG. 8, one of the three microlenses 303, which deviates from a position between the optical fibers 301a and 301b, does not contribute to the optical connection between the optical fibers 301a and 301b.

Fourth Embodiment

Figure 9A:
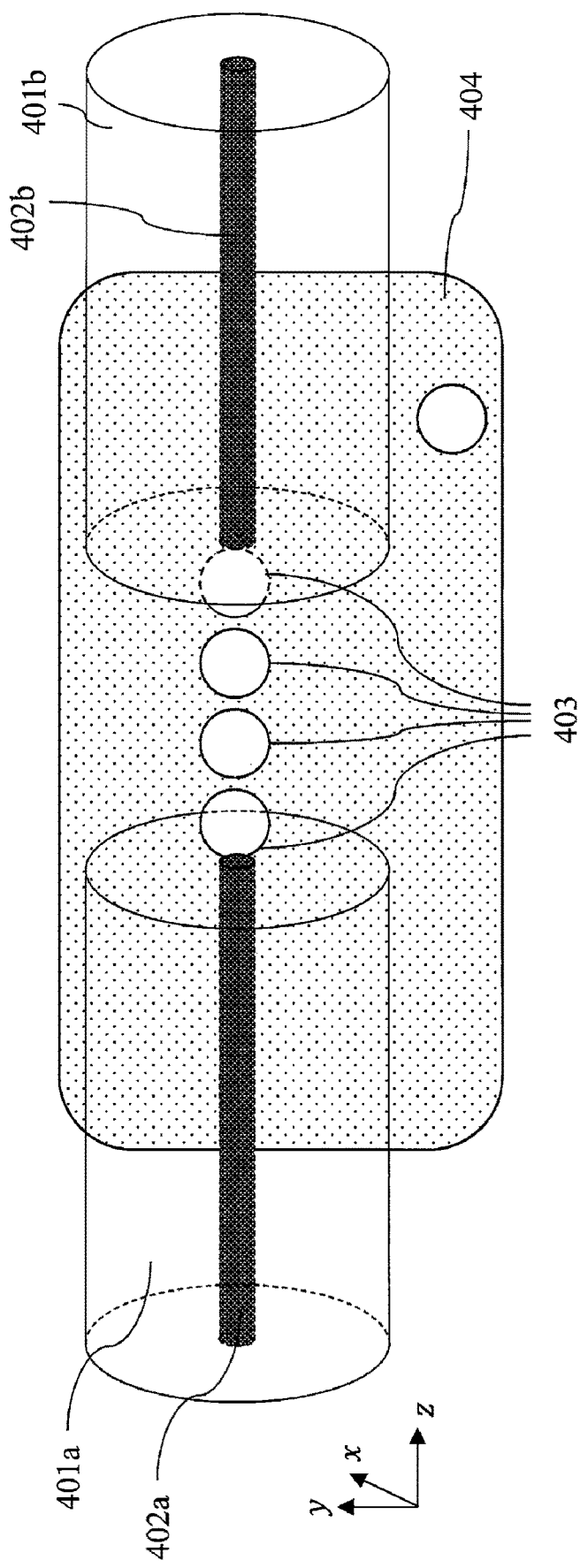
FIGS. 9A and 9B are a perspective view of the connection structure of the optical waveguide elements according to the fourth embodiment, and a cross-sectional view of the connection structure of the optical waveguide elements before optical connection.
Figure 9B:
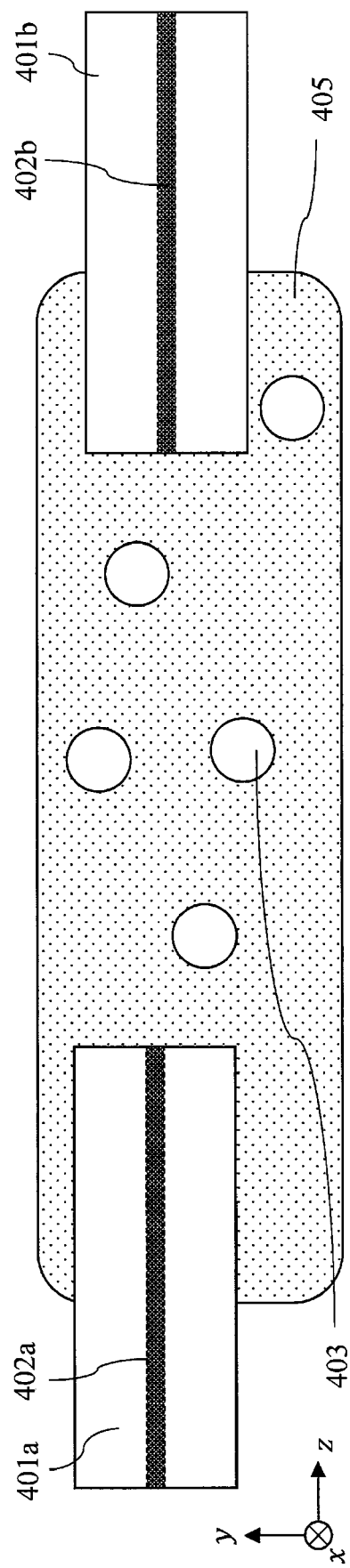
Figure 10:
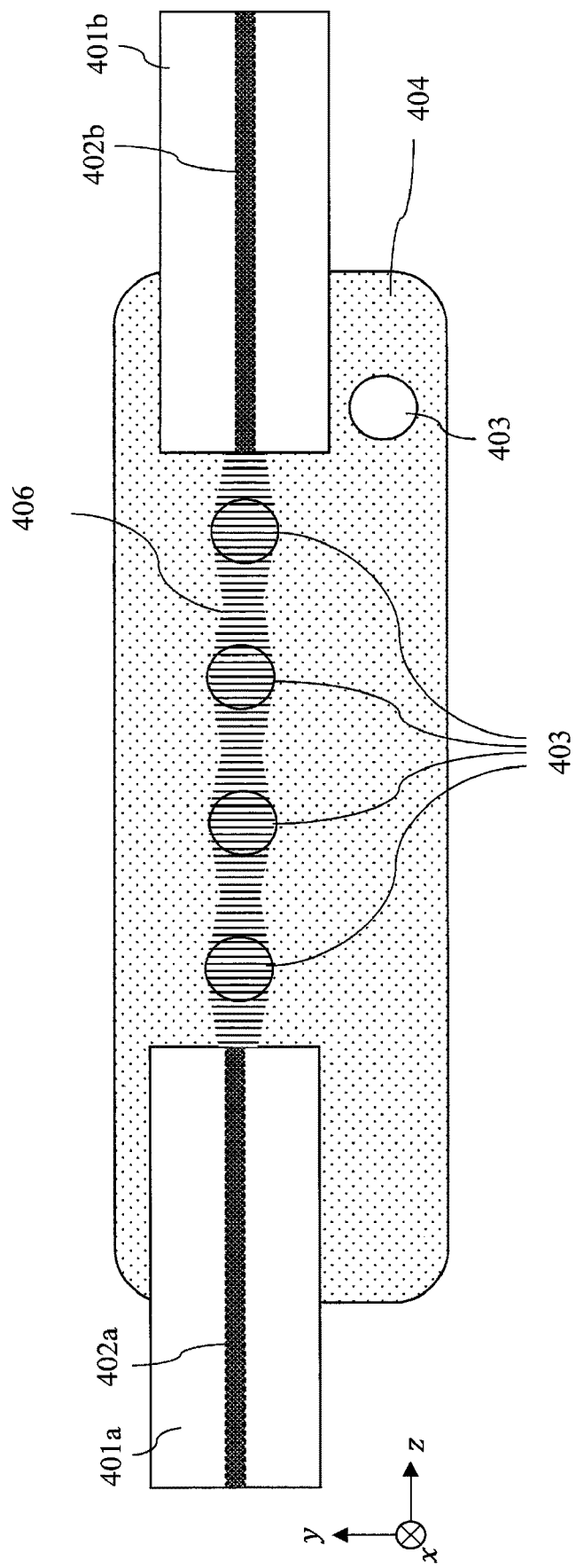
FIG. 10 is a cross-sectional view of the connection structure of the optical waveguide elements after optical connection according to the fourth embodiment.

Next, a fourth embodiment will be described. In the present example, an example in which optical fibers are connected to each other via four microlenses will be described. FIGS. 9A, 9B, and 10 are schematic views illustrating a connection structure of optical waveguide elements according to the present example. FIG. 9A is a perspective view of a connection structure of the optical waveguide elements, FIG. 9B is a cross-sectional view of a connection structure before optical connection cut along a yz plane, and FIG. 10 is a cross-sectional view of a connection structure after optical connection cut along the yz plane.

As illustrated in FIG. 9A, an optical fiber core 402a is formed inside an optical fiber 401a, and an optical fiber core 402b is formed inside an optical fiber 401b. The two optical fibers 401a and 401b, are optically connected by a cured adhesive 404 and four microlenses 403. Further, the cured adhesive 404 mechanically connects the two optical fibers 401a and 401b and the microlens 403.

As is clear from the cross-sectional view before optical connection illustrated in FIG. 9B, both end portions of the optical fibers 401a and 401b and the microlens 403 are covered with an adhesive 405 before curing. In a state of FIG. 9B, light waves for alignment for operating optical tweezers are passed through at least one of the two optical fibers 401a or 401b, so that a position of the microlens 403 can be changed in the adhesive 405 before curing.

Because a flow of alignment processing in the present example is the same as that of the second embodiment, an alignment method of the present example will be described with reference to FIG. 6. First, end portions of the optical fibers 401a and 401b and the microlens 403 are covered with the adhesive 405 (bonding material) that is in a semi-solid state before curing in a state in which incidence and emission end faces of the end portions of the two optical fibers 401a and 401b face each other, and a plurality of microlenses 403 are disposed between the end portion of the optical fiber 401a and the end portion of the optical fiber 401b, as illustrated in FIG. 9B (step S200 in FIG. 6). In this case, a pedestal, a jig, or the like may be used to dispose the optical fibers 401a and 401b and the microlens 403.

Subsequently, light for alignment is caused to be incident on at least one of the optical fibers 401a or 401b from a light source for alignment (not illustrated) so that the light enters a portion covered with the adhesive 405 between the end portion of the optical fiber 401a and the end portion of the optical fiber 401b (step S201 in FIG. 6). When the light for alignment is caused to be incident on the portion covered with the adhesive 405 between the end portion of the optical fiber 401a and the end portion of the optical fiber 401b, the plurality of microlenses 403 (four microlenses 403 in the present example) are moved to a position where light intensity becomes high due to radiation pressure of the light.

After the microlens 403 is moved, the incidence of the light for alignment is stopped and the adhesive 405 is cured (step S202 in FIG. 6). Thus, the adhesive 405 changes state to a cured solid adhesive 404, and the optical fibers 401a and 401b and the microlens 403 are mechanically connected. Further, it is possible to obtain a stable optical connection between the optical fibers 401a and 401b via the cured adhesive 404 and the four microlenses 403, and to achieve the alignment of the optical fibers 401a and 401b. Therefore, in the present example, it is possible to achieve the optical connection between the optical fibers 401a and 401b using only passive alignment without active alignment, and to reduce a mounting time and a mounting cost in the connection between the optical fibers 401a and 401b in comparison with a case in which the active alignment is used.

Similar to the second embodiment, even when there is a deviation between xy coordinates of an optical axis of the optical fiber 401a and xy coordinates of an optical axis of the optical fiber 401b in the state of FIG. 9B, it is possible to move the microlens 403 to an appropriate position on an optical path in which intensity of the light incident on the adhesive 405 from the optical fiber 401a and intensity of the light incident on the adhesive 405 from the optical fiber 401b are balanced, by causing the light for alignment to be simultaneously incident on both the optical fibers 401a and 401b. In the present example, four microlenses 403 are disposed between the end portion of the optical fiber 401a and the end portion of the optical fiber 401b before the optical connection. The four microlenses 403 are moved to be aligned with a position on the optical path in which the intensity of the light incident on the adhesive 405 from the optical fiber 401a and the intensity of the light incident on the adhesive 405 from the optical fiber 401b are balanced.

It is possible to change a mode of propagation of light 406 in the communication wavelength band using the microlens 403 in a state in which the alignment is completed as illustrated in FIG. 10, by performing a design so that an optical length of a longest portion of an outer shape of the microlens 403 exceeds a wavelength of light in a desired communication wavelength band. Specifically, it is possible to cause the light 406 emitted from the optical fiber 401a to be incident on the optical fiber core 402b of the optical fiber 401b via the four microlenses 403. On the other hand, it is possible to cause the light 406 emitted from the optical fiber 401b to be incident on the optical fiber core 402a of the optical fiber 401a via the four microlenses 403.

The adhesive 405 before curing and the microlens 403 are required to have different refractive indexes at a wavelength of the light for alignment. For the achievement of the alignment of the present example, it is necessary for a proportion of a volume of the microlens 403 not to exceed 74% of a total volume of the adhesive 405 before curing and the microlens 403. The wavelength of the light 406 in a communication wavelength band used in a practical use stage of optical signal processing may be the same as or different from the wavelength of the light for alignment. Similarly, intensity of the light 406 in the communication wavelength band may be the same as or different from the intensity of the light for alignment.

A UV curable adhesive or a thermosetting adhesive is optimal as the bonding material, but a material or a curing method is not limited to the present example as long as the material is transparent to the light in the communication wavelength band and the light for alignment.

In the present example, because the number of microlenses 403 contributing to the optical connection between the optical fibers 401a and 401b is 4, it is possible to increase a flexibility in design in comparison with a case in which the number of microlenses contributing to the optical connection is smaller than 4.

Further, when there is no problem in the optical connection, there may be a microlens 403 through which the light 406 in the communication wavelength band does not pass and that does not contribute to the optical connection. In the example of FIG. 10, one of the five microlenses 403, which deviates from a position between the optical fibers 401a and 401b, does not contribute to the optical connection between the optical fibers 401a and 401b.

Fifth Embodiment

Figure 11A:
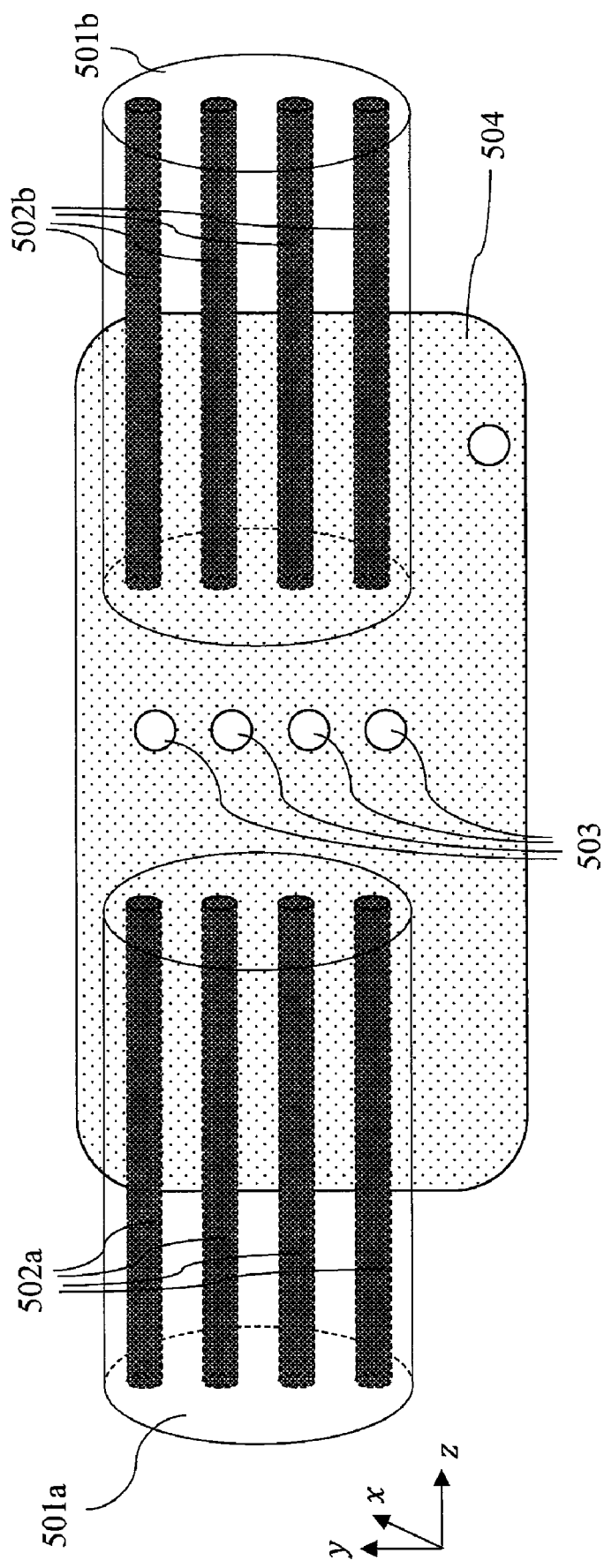
FIGS. 11A and 11B are a perspective view of a connection structure of optical waveguide elements according to a fifth embodiment, and a cross-sectional view of the connection structure of the optical waveguide elements before optical connection.
Figure 11B:
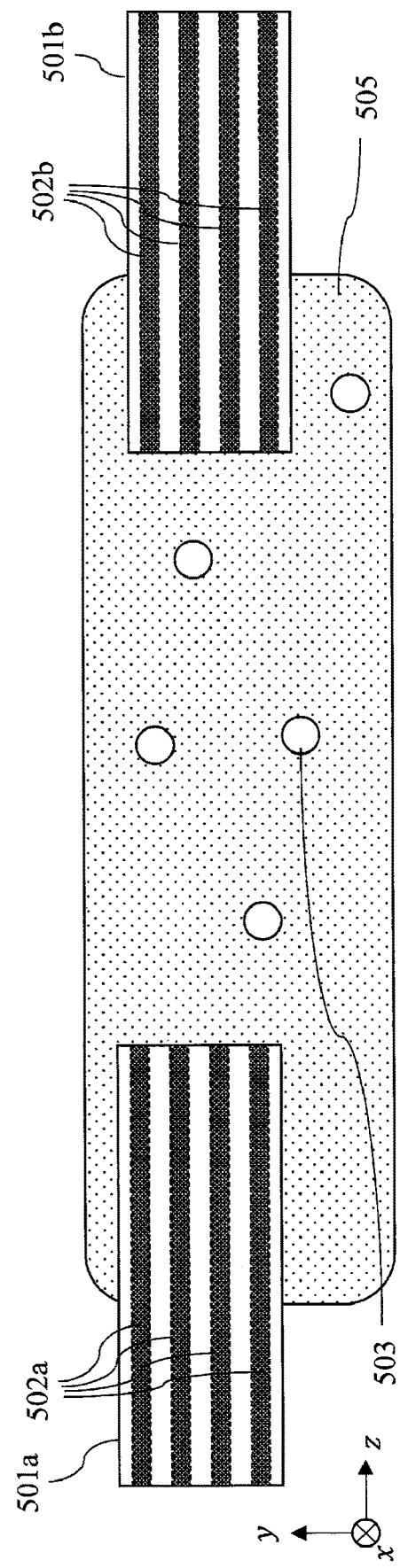
Figure 12:
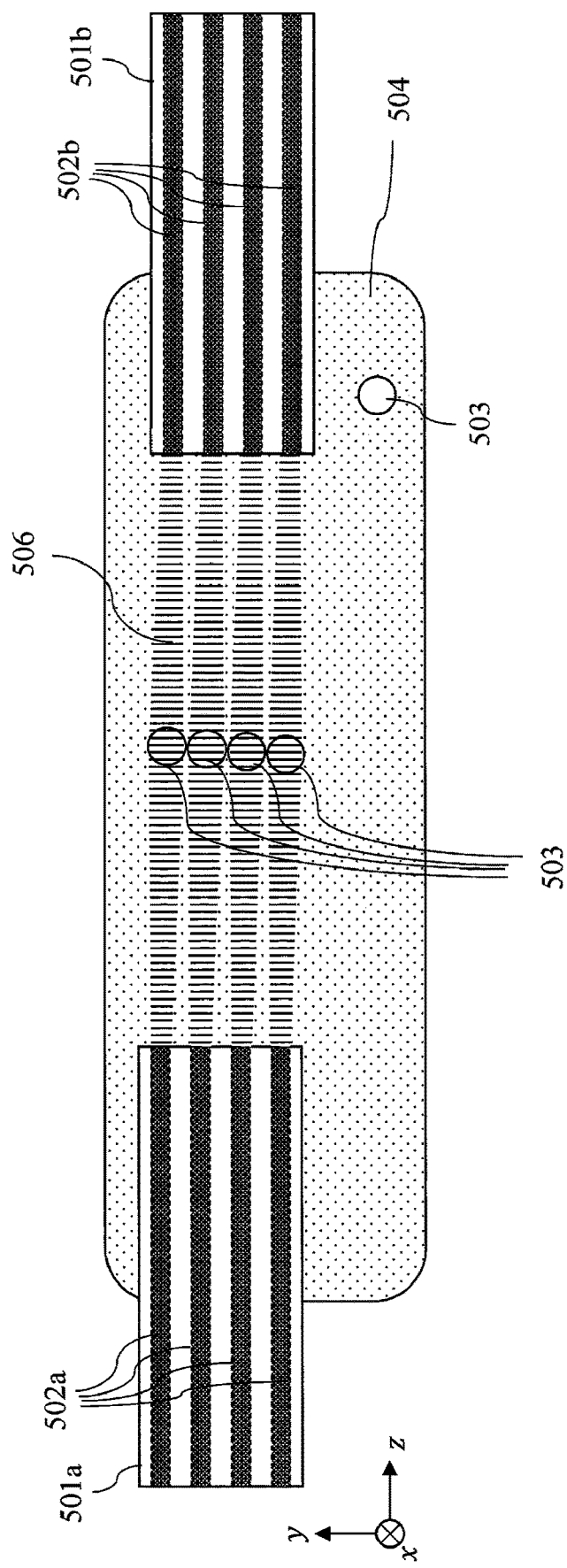
FIG. 12 is a cross-sectional view of the connection structure of the optical waveguide elements after optical connection according to the fifth embodiment.

Next, a fifth embodiment will be described. In the present example, an example in which MCFs, which are optical waveguide elements, are connected to each other via one microlens per core will be described. FIGS. 11A, 11B, and 12 are schematic views illustrating a connection structure of the optical waveguide elements according to the present example. FIG. 11A is a perspective view of a connection structure of the optical waveguide elements, FIG. 11B is a cross-sectional view of a connection structure before optical connection cut along a yz plane, and FIG. 12 is a cross-sectional view of a connection structure after optical connection cut along the yz plane.

As illustrated in FIG. 11A, four optical fiber cores 502a (optical waveguides) are formed inside an MCF sola, and four optical fiber cores 502b (optical waveguides) are formed inside an MCF 501b. The two MCFs 501a and 501b, are optically connected by a cured adhesive 504 and one microlens 503 per core. Further, the cured adhesive 504 mechanically connects the two MCFs 501a and 501b and the microlens 503.

As is clear from the cross-sectional view before optical connection illustrated in FIG. 11B, both the end portions of the MCFs 501a and 501b, and the microlens 503 are covered with an adhesive 505 before curing. In a state of FIG. 11B, light waves for alignment for operating optical tweezers are passed through at least one of the two MCFs 501a or 501b, so that a position of the microlens 503 can be changed in the adhesive 505 before curing.

Figure 13:
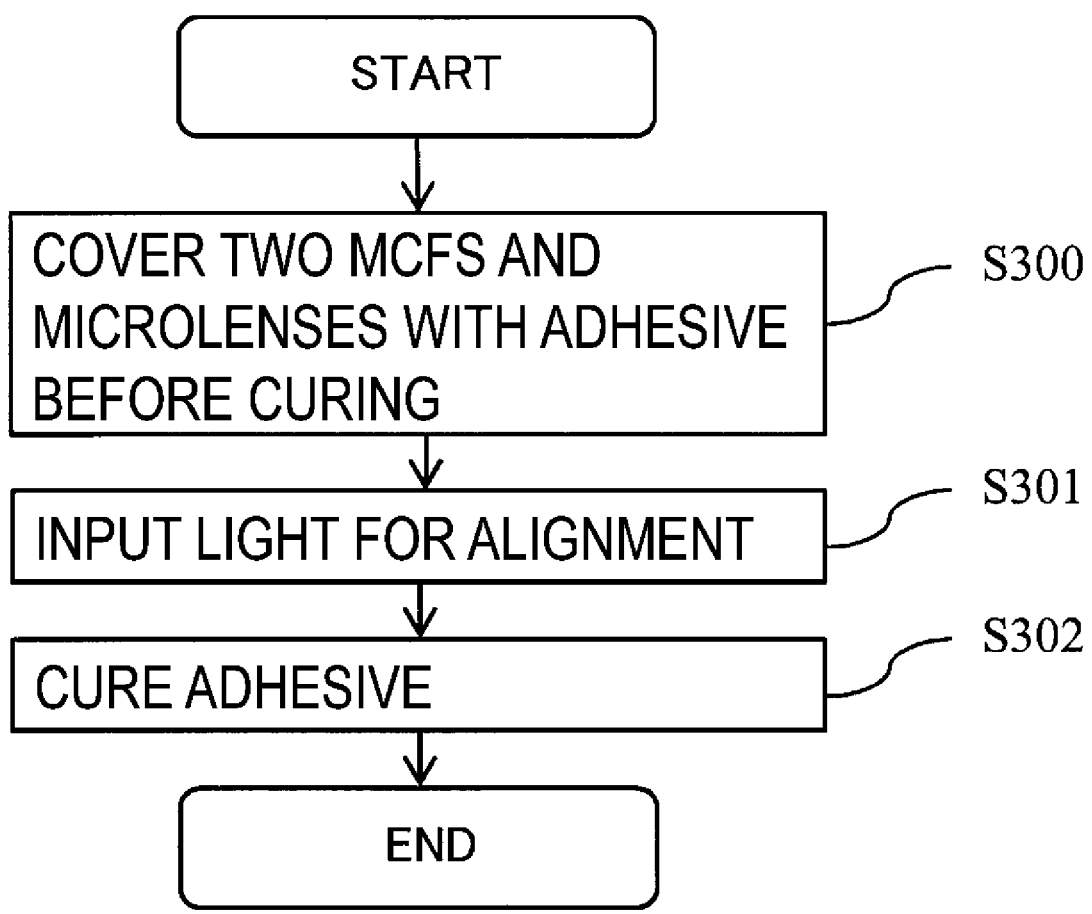
FIG. 13 is a flowchart illustrating an alignment method according to the fifth embodiment.

FIG. 13 is a flowchart illustrating an alignment method of the present example. First, end portions of the MCFs 501a, 501b, and the microlens 503 are covered with the adhesive 505 (bonding material) that is in a semi-solid state before curing in a state in which incidence and emission end faces of the end portions of the two MCFs 501a and 501b face each other, and a plurality of microlenses 503 are disposed between the end portion of the MCF 501a and the end portion of the MCF 501b, as illustrated in FIG. 11B (step S300 in FIG. 13). In this case, a pedestal, a jig, or the like may be used to dispose the MCFs 501a and 501b and the microlens 503.

In the present example, the numbers of optical fiber cores of the MCFs 501a and 501b are the same, and a pitch of the optical fiber core 502a and a pitch of the optical fiber core 502b are also the same. In the present example, it is preferable that a direction in which the optical fiber cores 502a are arranged is substantially parallel to a direction in which the optical fiber cores 502b are arranged in a state before the optical connection illustrated in FIG. 11B, and an amount of deviation between an optical axis of the optical fiber core 502a and an optical axis of the optical fiber core 502b corresponding thereto (an amount of deviation in a y direction in FIG. 11B) is smaller than ½ of a pitch of the optical fiber cores 502a and 502b. It is preferable to use a pedestal, a jig, or the like so that mechanical alignment accuracy of the adhesive 505 before curing can be achieved as described above.

Subsequently, light for alignment is caused to be incident on at least one of the MCFs 501a or 501b from a light source for alignment (not illustrated) so that the light enters a portion covered with the adhesive 505 between the end portion of the MCF 501a and the end portion of the MCF 501b (step S301 in FIG. 13). When the light for alignment is caused to be incident on the portion covered with the adhesive 505 between the end portion of the MCF 501a and the end portion of the MCF 501b, the plurality of microlenses 503 (four microlenses 503 in the present example) are moved to a position where light intensity becomes high due to radiation pressure of the light.

After the microlens 503 is moved, the incidence of the light for alignment is stopped and the adhesive 505 is cured (step S302 in FIG. 13). Thus, the adhesive 505 changes state to a cured solid adhesive 504, and the MCFs 501a and 501b and the microlens 503 are mechanically connected. Further, it is possible to obtain a stable optical connection between the MCFs 501a and 501b via the cured adhesive 504 and one microlenses 503 per core, and to achieve the alignment of the MCFs 501a and 501b. Therefore, in the present example, it is possible to achieve the optical connection between the MCFs 501a and 501b using only passive alignment without active alignment, and to reduce a mounting time and a mounting cost in the connection between the MCFs 501a and 501b in comparison with a case in which the active alignment is used.

It is possible to move the microlens 503 to an appropriate position on the optical path in which the intensity of the light incident on the adhesive 505 from the optical fiber core 502a and the intensity of the light incident on the adhesive 505 from the optical fiber core 502b are balanced, by causing the light for alignment to be simultaneously incident on all the optical fiber cores 502a and 502b even when there is a deviation between xy coordinates of an optical axis of the optical fiber core 502a of the MCF 501a and xy coordinates of an optical axis of the optical fiber core 502b of the corresponding MCF 501b) under a condition that the mechanical alignment accuracy is satisfied as described above in the state of FIG. 11B.

In the present example, four microlenses 503 are disposed between the end portion of the MCF 501a and the end portion of the MCF 501b) before the optical connection. Each microlens 503 is moved to a position on the optical path in which the intensity of light incident on the adhesive 505 from one optical fiber core 502a and the intensity of light incident on the adhesive 505 from the opposite optical fiber core 502b are balanced. Because at least one microlens 503 is disposed between each of the optical fiber cores 502a and the corresponding one of the optical fiber cores 502b in the state of FIG. 12, it is preferable for the number of microlenses 503 exceeding the number of optical fiber cores to be disposed between the end portion of the MCF 501a and the end portion of the MCF 501b in the state before the optical connection of FIG. 11B.

It is possible to change a mode of propagation of light 506 in the communication wavelength band using the microlens 503 in a state in which the alignment is completed as illustrated in FIG. 12, by performing a design so that an optical length of a longest portion of an outer shape of the microlens 503 exceeds a wavelength of light in a desired communication wavelength band. Specifically, it is possible to cause the light 506 emitted from one optical fiber core 502a of the MCF 501a to be incident on the corresponding optical fiber core 502b of the MCF 501b via one microlens 503. On the other hand, it is possible to cause the light 506 emitted from one optical fiber core 502b of the MCF 501b to be incident on the corresponding optical fiber core 502a of the MCF 501a via one microlens 503.

The adhesive 505 before curing and the microlens 503 are required to have different refractive indexes at a wavelength of the light for alignment. For the achievement of the alignment of the present example, it is necessary for a proportion of a volume of the microlens 503 not to exceed 74% of a total volume of the adhesive 505 before curing and the microlens 503. The wavelength of the light 506 in a communication wavelength band used in a practical use stage of optical signal processing may be the same as or different from the wavelength of the light for alignment. Similarly, intensity of the light 506 in the communication wavelength band may be the same as or different from the intensity of the light for alignment.

A UV curable adhesive or a thermosetting adhesive is optimal as the bonding material, but a material or a curing method is not limited to the present example as long as the material is transparent to the light in the communication wavelength band and the light for alignment. Further, when there is no problem in the optical connection, there may be a microlens 503 through which the light 506 in the communication wavelength band does not pass and that does not contribute to the optical connection. In the example of FIG. 12, one of the five microlenses 503, which deviates from a position between the MCFs 501a and 501b, does not contribute to the optical connection between the MCFs 501a and 501b.

Sixth Embodiment

Figure 14A:
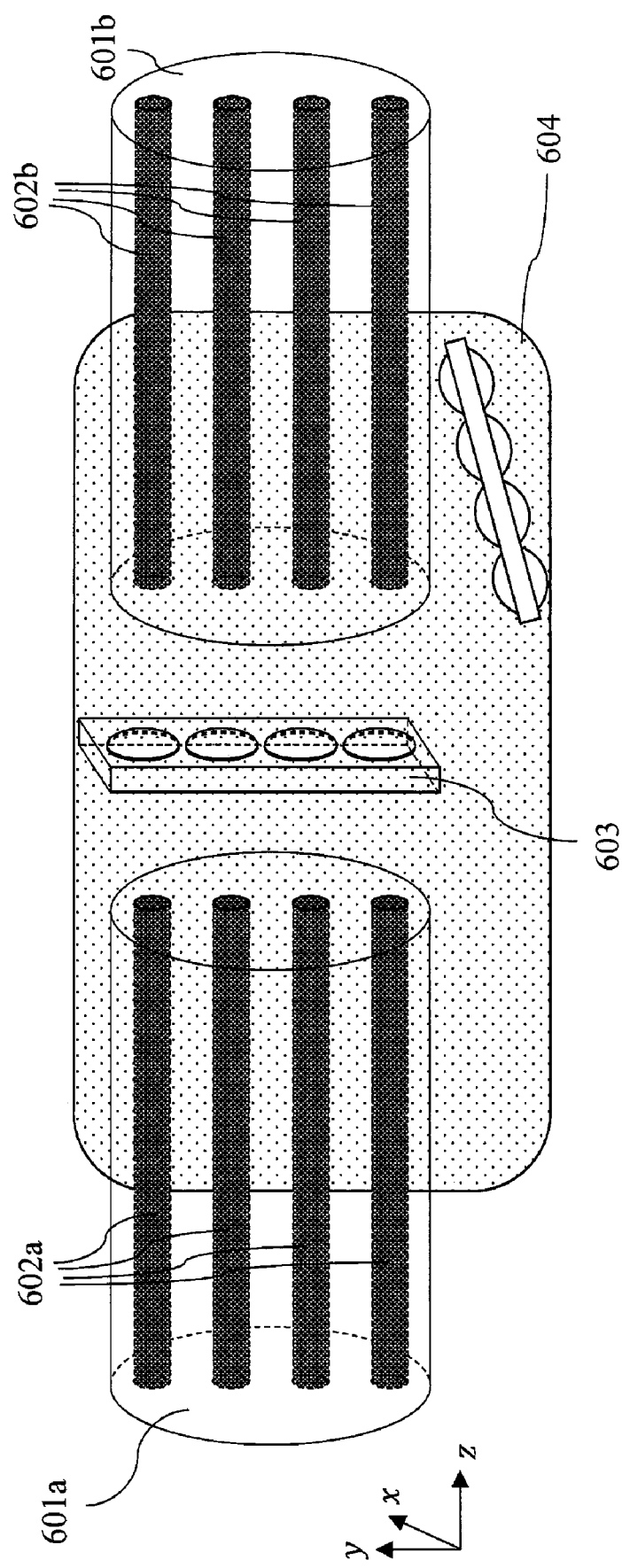
FIGS. 14A and 14B are a perspective view of a connection structure of optical waveguide elements according to a sixth embodiment, and a cross-sectional view of the connection structure of the optical waveguide elements before optical connection.
Figure 14B:
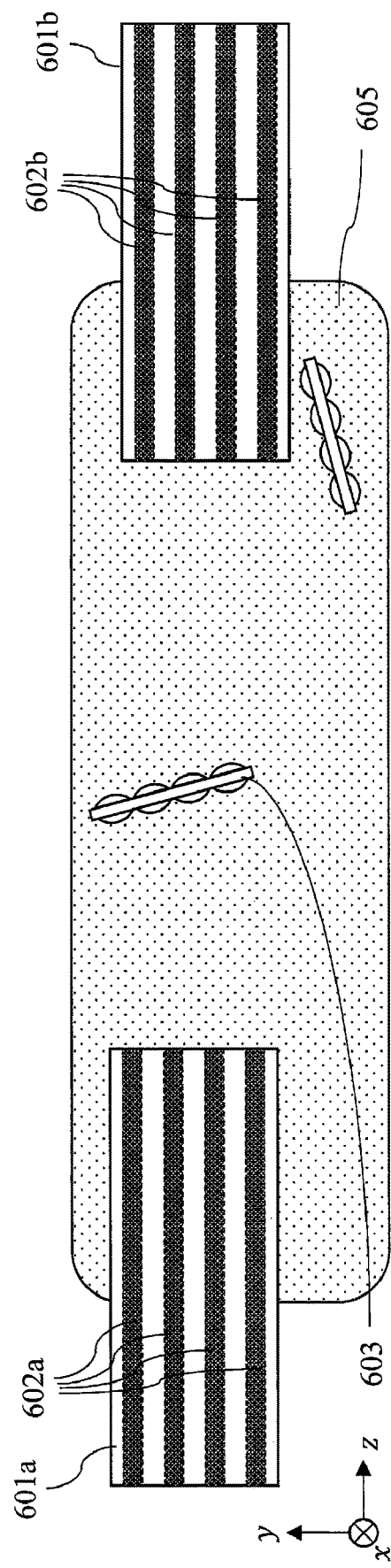
Figure 15:
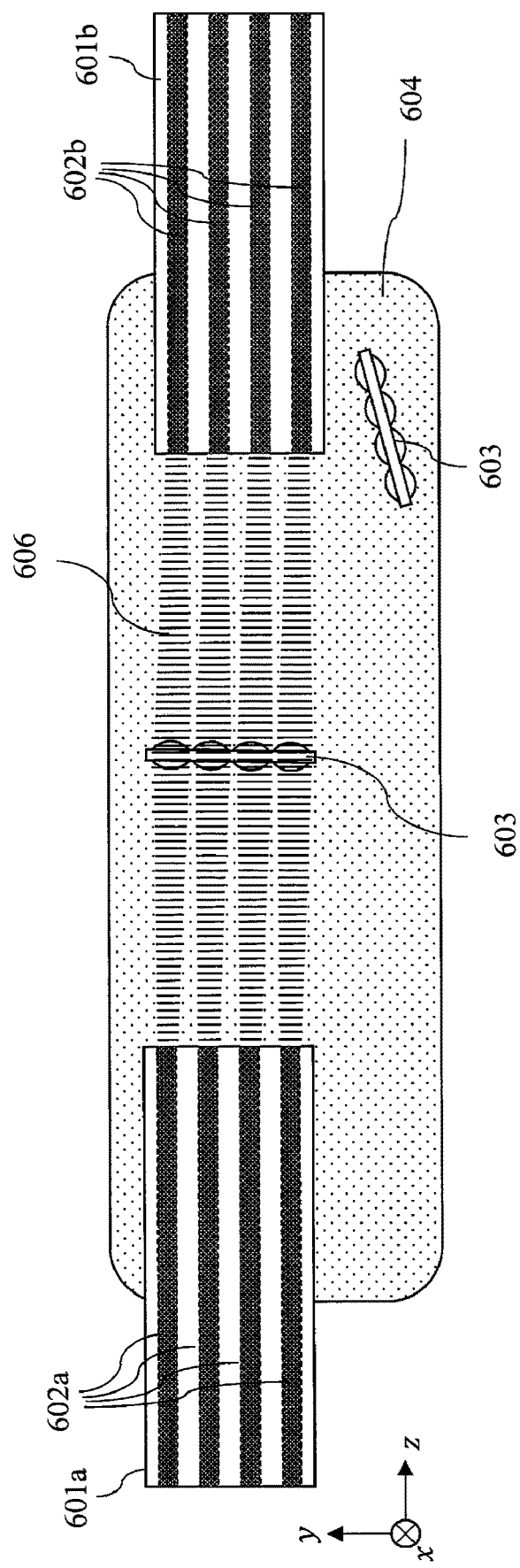
FIG. 15 is a cross-sectional view of the connection structure of the optical waveguide elements after optical connection according to the sixth embodiment.

Next, a sixth embodiment will be described. In the present example, an example in which MCFs are connected to each other via a microlens array will be described. FIGS. 14A, 14B and 15 are schematic views illustrating a connection structure of the optical waveguide elements according to the present example. FIG. 14A is a perspective view of a connection structure of the optical waveguide elements, FIG. 14B is a cross-sectional view of a connection structure before optical connection cut along a yz plane, and FIG. 15 is a cross-sectional view of a connection structure after optical connection cut along the yz plane.

As illustrated in FIG. 14A, four optical fiber cores 602a (optical waveguides) are formed inside an MCF 601a, and four optical fiber cores 602b (optical waveguides) are formed inside an MCF 601b. The two MCFs 601a and 601b are optically connected by a cured adhesive 604 and a microlens array 603. Further, the cured adhesive 604 mechanically connects the two MCFs 601a and 601b and the microlens array 603.

As is clear from the cross-sectional view before optical connection illustrated in FIG. 14B, both the end portions of the MCFs 601a and 601b and the microlens array 603 are covered with an adhesive 605 before curing. In a state of FIG. 14B, light waves for alignment for operating optical tweezers are passed through at least one of the two MCFs 601a or 601b, so that a position of the microlens array 603 can be changed in the adhesive 605 before curing.

Figure 16:
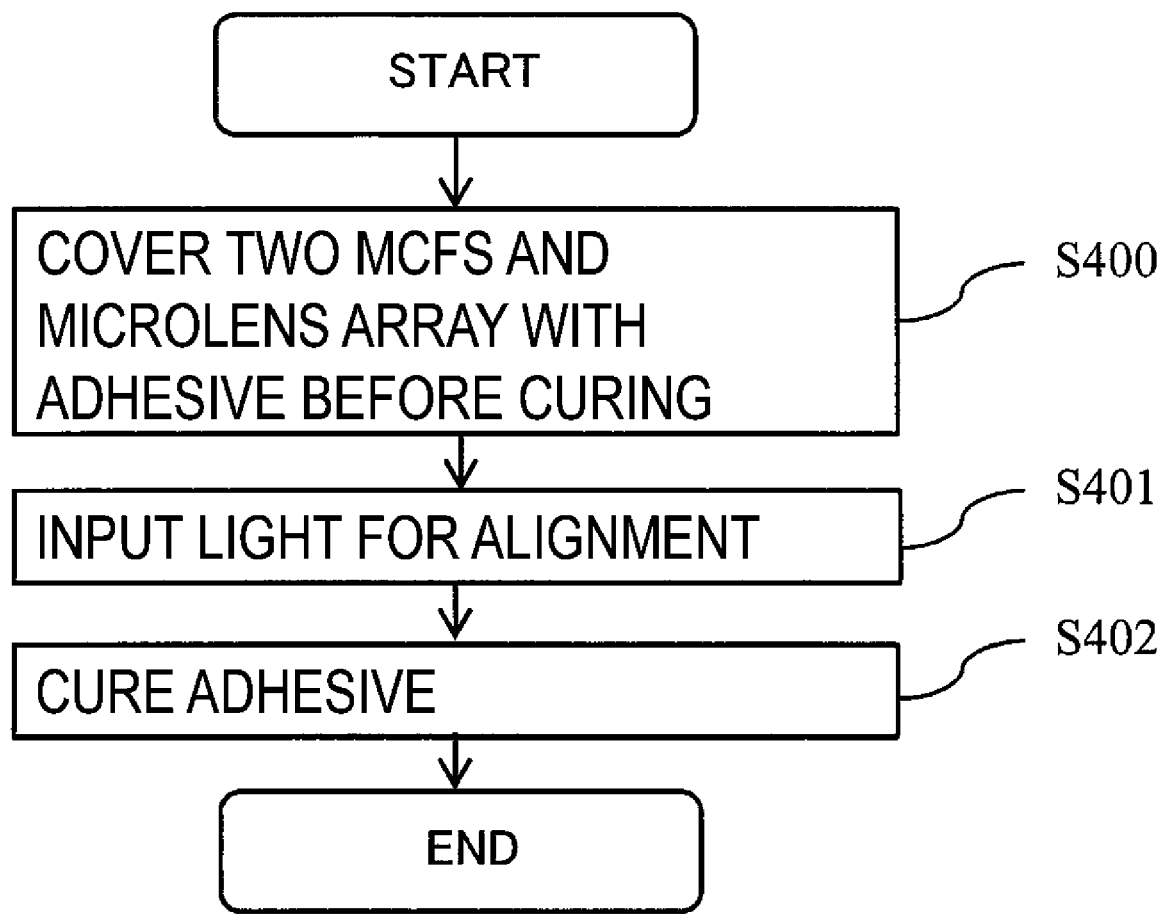
FIG. 16 is a flowchart illustrating an alignment method according to the sixth embodiment.
Figure 17:
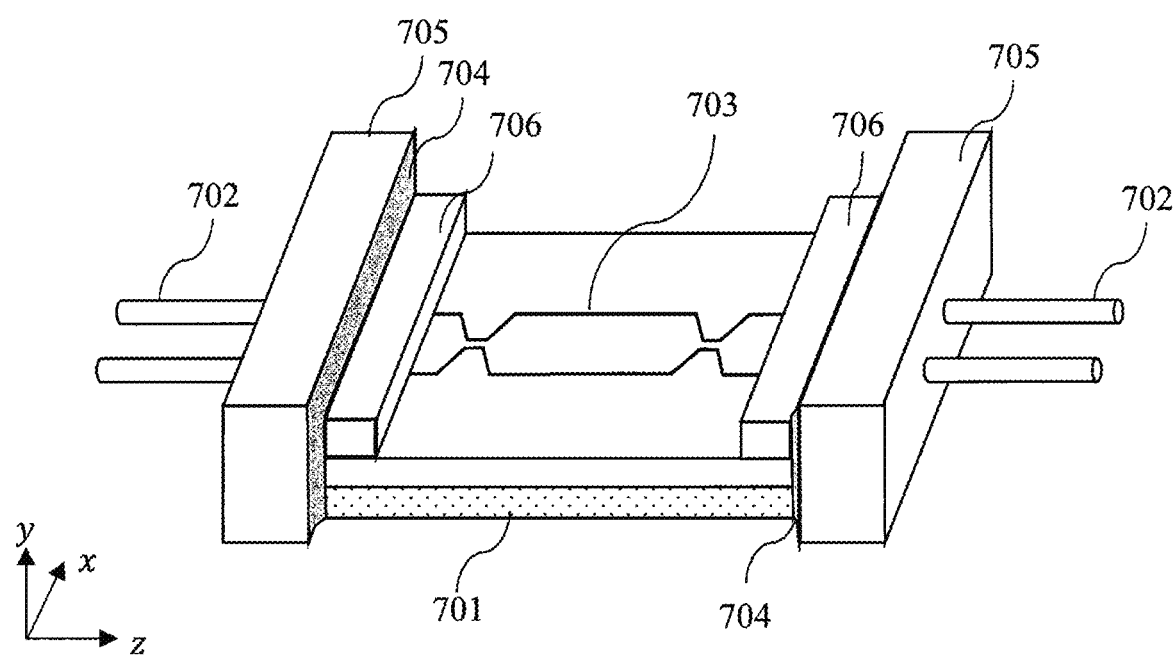
FIG. 17 is a perspective view illustrating an example of direct optical coupling at a PLC end face.

FIG. 16 is a flowchart illustrating an alignment method of the present example. First, end portions of the MCFs 601a and 601b and the microlens array 603 are covered with the adhesive 605 (bonding material) that is in a semi-solid state before curing in a state in which incidence and emission end faces of the end portions of the two MCFs 601a and 601b face each other, and the microlens array 603 is disposed between the end portion of the MCF 601a and the end portion of the MCF 601b, as illustrated in FIG. 14B (step S400 in FIG. 16). In this case, a pedestal, a jig, or the like may be used to dispose the MCFs 601a and 601b and the microlens array 603.

In the present example, the numbers of optical fiber cores of the MCFs 601a and 601b are the same, and a pitch of the optical fiber core 602a and a pitch of the optical fiber core 602b are also the same. In the microlens array 603, the same number of lenses as the number of optical fiber cores of the MCFs 601a and 601b are arranged on a substrate at the same pitch as the optical fiber cores 602a and 602b.

In the present example, it is preferable that a direction in which the optical fiber cores 602a are arranged is substantially parallel to a direction in which the optical fiber cores 602b are arranged in a state before the optical connection illustrated in FIG. 14B, and an amount of deviation between an optical axis of the optical fiber core 602a and an optical axis of the optical fiber core 602b corresponding thereto (an amount of deviation in a y direction in FIG. 14B) is smaller than ½ of a pitch of the optical fiber cores 602a and 602b. It is preferable to use a pedestal, a jig, or the like so that mechanical alignment accuracy of the adhesive 605 before curing can be achieved as described above.

Subsequently, light for alignment is caused to be incident on at least one of the MCFs 601a or 601b from a light source for alignment (not illustrated) so that the light enters a portion covered with the adhesive 605 between the end portion of the MCF 601a and the end portion of the MCF 601b (step S401 in FIG. 16). When the light for alignment is caused to be incident on the portion covered with the adhesive 605 between the end portion of the MCF 601a and the end portion of the MCF 601b, the microlens array 603 is moved to a position where light intensity becomes high due to radiation pressure of the light.

After the microlens array 603 is moved, the incidence of the light for alignment is stopped and the adhesive 605 is cured (step S402 in FIG. 16). Thus, the adhesive 605 changes state to a cured solid adhesive 604, and the MCFs 601a and 601b and the microlens array 603 are mechanically connected. Further, it is possible to obtain a stable optical connection between the MCFs 601a and 601b via the cured adhesive 604 and each lens of the microlens array 603, and to achieve the alignment of the MCFs 601a and 601b. Therefore, in the present example, it is possible to achieve the optical connection between the MCFs 601a and 601b using only passive alignment without active alignment, and to reduce a mounting time and a mounting cost in the connection between the MCFs 601a and 601b in comparison with a case in which the active alignment is used.

It is possible to move the microlens array 603 to an appropriate position on the optical path in which the intensity of the light incident on the adhesive 605 from the optical fiber core 602a and the intensity of the light incident on the adhesive 605 from the optical fiber core 602b are balanced, by causing the light for alignment to be simultaneously incident on all the optical fiber cores 602a and 602b even when there is a deviation between xy coordinates of an optical axis of the optical fiber core 602a of the MCF 601a and xy coordinates of an optical axis of the optical fiber core 602b of the corresponding MCF 601b under a condition that the mechanical alignment accuracy is satisfied as described above in the state of FIG. 14B. In this case, the microlens array 603 moves so that one lens in the microlens array 603 is located on an optical path in which the intensity of the light incident on the adhesive 605 from one optical fiber core 602a and the intensity of the light incident on the adhesive 605 from the corresponding optical fiber core 602b are balanced.

It is possible to change a mode of propagation of light 606 in the communication wavelength band using the microlens array 603 in a state in which the alignment is completed as illustrated in FIG. 15, by performing a design so that an optical length in a direction (y direction in FIG. 15) of an outer shape of the microlens array 603 orthogonal to the optical axis exceeds a wavelength of light in a desired communication wavelength band. Specifically, it is possible to cause the light 606 emitted from one optical fiber core 602a of the MCF 601a to be incident on the corresponding optical fiber core 602b of the MCF 601b via one lens of the microlens array 603. On the other hand, it is possible to cause the light 606 emitted from one optical fiber core 602b of the MCF 601b to be incident on the corresponding optical fiber core 602a of the MCF 601a via one lens of the microlens array 603.

The adhesive 605 before curing and the microlens array 603 are required to have different refractive indexes at a wavelength of the light for alignment. For the achievement of the alignment of the present example, it is necessary for a proportion of a volume of the microlens array 603 not to exceed 74% of a total volume of the adhesive 605 before curing and the microlens array 603. The wavelength of the light 606 in a communication wavelength band used in a practical use stage of optical signal processing may be the same as or different from the wavelength of the light for alignment. Similarly, intensity of the light 606 in the communication wavelength band may be the same as or different from the intensity of the light for alignment.

A UV curable adhesive or a thermosetting adhesive is optimal as the bonding material, but a material or a curing method is not limited to the present example as long as the material is transparent to the light in the communication wavelength band and the light for alignment. Further, when there is no problem in the optical connection, there may be a microlens array 603 through which the light 606 in the communication wavelength band does not pass and that does not contribute to the optical connection. In the example of FIG. 15, one of the two microlens arrays 603, which deviates from a position between the MCFs 601a and 601b, does not contribute to the optical connection between the MCFs 601a and 601b.

In the present disclosure, there is no particular limitation on types of two optical waveguide elements that are connected. The optical waveguide elements illustrated in the first to sixth embodiments are optical fibers, MCFs, and PLCs, but these are merely examples and the present disclosure may be applied to optical waveguide elements such as FBGs, polarization-retaining fibers, LDs, photodetectors (PDs), and modulators. That is, the present disclosure is independent of a type and configuration of the optical waveguide element.

In the first to sixth embodiments, the microlens or the microlens array is used as the spatial optical element responsible for optical coupling between the optical waveguide elements. It is possible to reduce a cost of members by adopting members that are inexpensively available in a market, such as the microlens or the microlens array. However, the first to sixth embodiments are merely examples and other spatial optical elements may be used.

Further, in the first to sixth embodiments, a form in which the number of microlenses responsible for optical coupling between the optical waveguide elements is one, two, and four, and a form in which the number of microlens arrays responsible for optical coupling is one have been illustrated, but these are merely examples and it is possible to use the other numbers of spatial optical elements other than the numbers in the first to sixth embodiments.

In the first to sixth embodiments, although it is possible to implement the microlens and the microlens array exemplified as the spatial optical element using an inorganic material such as quartz glass or an organic material such as polystyrene resin, a spatial optical element made of other materials may be used.

Further, in the first to sixth embodiments, only the adhesive is used as a bonding material for fixing the optical waveguide element and the spatial optical element, but this is just an example and other materials may be used.

Further, although an example in which two optical waveguide elements are connected has been described in the first to sixth embodiments, it is also possible to connect three or more optical waveguide elements. When the three or more optical waveguide elements are connected, a spatial optical element capable of connecting three or more optical waveguide elements may be used.

Further, even when the PLC is used as the optical waveguide element as in the first embodiment, a material system constituting the PLC can be freely selected. In a system using a quartz-based PLC, a Si substrate can be used as a support substrate, and a clad layer made of $SiO_2$ can be used as a clad layer. In addition, a PLC having a waveguide structure made of a material in a dielectric material system such as a $TaO_2/SiO_2$ system or a lithium niobate material system or a waveguide structure made of a compound semiconductor material, a PLC made of a silicon photonics material system, or the like can be freely adopted. Therefore, a waveguide type LD and a waveguide type PD are also included in the PLC.

INDUSTRIAL APPLICABILITY

The present disclosure can be applied to a technology for optically connecting optical waveguide elements to each other.

REFERENCE SIGNS LIST 101, 201a, 201b, 301a, 301b, 401a, 401b Optical fiber
501a, 501b, 601a, 601b MCF
102, 202a, 202b, 302a, 302b, 402a, 402b, 502a, 502b, 602a, 602b Optical fiber core
103, 203, 303, 403, 503 Microlens
603 Microlens array
104, 204, 304, 404, 504, 604 Cured adhesive
105, 205, 305, 405, 505, 605 Adhesive before curing
106, 206, 306, 406, 506, 606 Light in communication wavelength band
107 PLC
108 PLC core

The invention claimed is:

1. An optical waveguide alignment method comprising:
covering each of end portions of at least two optical waveguide elements and at least one spatial optical element with a bonding material in a semi-solid state, the at least one spatial optical element being disposed between incidence and emission end faces of the end portions of the at least two optical waveguide elements;
causing light for alignment to be incident on at least one of the at least two optical waveguide elements so that light enters a portion of the bonding material between the at least two optical waveguide elements; and
changing the bonding material into a solid state after the at least one spatial optical element moves onto an optical path between the incidence and emission end faces of the at least two optical waveguide elements due to radiation pressure of light acting on the at least one spatial optical element, wherein the at least two optical waveguide elements are optically connected via the bonding material and the at least one spatial optical element, and each of the at least two optical waveguide elements and the at least one spatial optical element are mechanically connected by the bonding material.

2. The optical waveguide alignment method of claim 1, wherein the bonding material is an adhesive.

3. The optical waveguide alignment method of claim 1, wherein the at least one spatial optical element is completely covered with the bonding material.

4. The optical waveguide alignment method of claim 1, wherein each of the at least two optical waveguide elements is capable of guiding light in a communication wavelength band and the light for alignment, and the at least one spatial optical element and the bonding material are transparent to the light in the communication wavelength band and the light for alignment.

5. The optical waveguide alignment method of claim 4, wherein an optical length of a longest portion of an outer shape of the at least one spatial optical element exceeds a wavelength of the light in the communication wavelength band.

6. The optical waveguide alignment method of claim 1, wherein the at least one spatial optical element is a microlens or a microlens array.

7. The optical waveguide alignment method of claim 1, wherein the at least one spatial optical element comprises a plurality of spatial optical elements and more than the number of the plurality of spatial optical elements required for optical connection between the at least two optical waveguide elements are included in the bonding material.

8. The optical waveguide alignment method of claim 1, wherein the at least one spatial optical element is a microlens, each of the at least two optical waveguide elements comprises a plurality of optical waveguides, and the changing comprises changing the bonding material into the solid state after at least one microlens moves so that each of the plurality of optical waveguides of the at least two optical waveguide elements are optically connected to each other via the bonding material and the at least one microlens.

9. The optical waveguide alignment method of claim 1, wherein the at least one spatial optical element is a microlens array comprising a plurality of lenses, each of the at least two optical waveguide elements comprises a plurality of optical waveguides, and the changing comprises changing the bonding material to the solid state after the microlens array moves so that each of the plurality of optical waveguides of the at least two optical waveguide elements are optically connected to each other via the bonding material and one lens of the microlens array.

10. An optical waveguide alignment method comprising:
covering a first end portion of a first waveguide, a second end portion of a second waveguide, and a first microlens with a bonding material in a semi-solid state, the first microlens disposed between the first end portion of the first waveguide and the second end portion of the second waveguide;

moving the first microlens into an optical path between the first waveguide and the second waveguide by incidenting alignment light on the first waveguide so that the alignment light enters a portion of the bonding material between the first waveguide and the second waveguide, wherein incidenting the alignment light on the first waveguide moves the first microlens due to radiation pressure of the alignment light; and after moving the first microlens, changing the bonding material into a solid state, wherein the first waveguide, the second waveguide, and the first microlens are mechanically connected by the bonding material in the solid state.

11. The optical waveguide alignment method of claim 10, wherein the bonding material is a UV curable adhesive.

12. The optical waveguide alignment method of claim 10, wherein the first microlens is completely covered with the bonding material.

13. The optical waveguide alignment method of claim 10, wherein the first waveguide and the second waveguide are each capable of guiding communications light in a communication wavelength band, and the first microlens and the bonding material are transparent to the communications light.

14. The optical waveguide alignment method of claim 13, wherein an optical length of a longest portion of an outer shape of the first microlens exceeds a wavelength of the communications light.

15. The optical waveguide alignment method of claim 10, wherein before changing the bonding material into the solid state, a volume of the first microlens does not exceed 74% of a total volume of the bonding material.

16. The optical waveguide alignment method of claim 10, wherein the first waveguide is an optical fiber and the second waveguide is a PLC.

17. The optical waveguide alignment method of claim 10, wherein the first waveguide is a first optical fiber and the second waveguide is a second optical fiber.

18. The optical waveguide alignment method of claim 10 further comprising:
covering a second microlens with the bonding material in the semi-solid state, wherein the second microlens is not moved into the optical path between the first waveguide and the second waveguide by incidenting the alignment light on the first waveguide.

19. The optical waveguide alignment method of claim 10, wherein a first optical axis of the first waveguide is offset from a second optical axis of the second waveguide.

20. The optical waveguide alignment method of claim 10, wherein after moving the first microlens, communications light emitted from the first waveguide is incident on the second waveguide via the first microlens.

* * * * *